（12） United States Patent
Slesinski et al.

(10) Patent No.: US 10,344,794 B2
(45) Date of Patent: Jul. 9, 2019

(54) OPEN COMPOSITE SHAFT

(71) Applicant: Dana Automotive Systems Group, LLC, Maumee, OH (US)

(72) Inventors: Steven G. Slesinski, Ann Arbor, MI (US); Eve Steigerwalt, Nashville, TN (US); Harry W. Trost, Royal Oak, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 390 days.

(21) Appl. No.: 15/355,957

(22) Filed: Nov. 18, 2016

(65) Prior Publication Data
US 2018/0142726 A1 May 24, 2018

(51) Int. Cl.
*F16C 3/02* (2006.01)
*B29C 53/58* (2006.01)
*B29C 65/56* (2006.01)
*B29C 70/30* (2006.01)
*B29C 70/54* (2006.01)
(Continued)

(52) U.S. Cl.
CPC .............. *F16C 3/026* (2013.01); *B29C 53/58* (2013.01); *B29C 70/30* (2013.01); *B29C 70/545* (2013.01); *B29C 70/766* (2013.01); *F16D 3/387* (2013.01); *B29K 2105/103* (2013.01); *B29L 2031/75* (2013.01)

(58) Field of Classification Search
CPC ......... B29C 53/58; B29C 65/56; B29C 70/30; B29C 70/545; B29C 70/766; B29K 2105/103; B29L 2031/75; F16C 3/023; F16C 3/026; F16C 2326/06; F16D 3/387
USPC ................................. 464/180–183
See application file for complete search history.

(56) References Cited

U.S. PATENT DOCUMENTS

| 3,592,884 A | | 7/1971 | Williams |
| 4,173,128 A | * | 11/1979 | Corvelli ................. F16C 3/026 464/183 |

(Continued)

FOREIGN PATENT DOCUMENTS

| EP | 0109451 A1 | * | 5/1984 | .............. F16C 3/026 |
| JP | 05087118 A | * | 4/1993 | .............. F16C 3/026 |
| JP | H0742974 B2 | * | 5/1995 | .............. F16C 3/026 |

OTHER PUBLICATIONS

Gurley, A. et al. The Design of Optimal Lattice Structures Manufactured by Maypole Braiding, Journal of Mechanical Design, 2015, ASME, vol. 137 pp. 101401-1 to 101401-8.

*Primary Examiner* — Josh Skroupa
(74) *Attorney, Agent, or Firm* — Marshall & Melhorn, LLC

(57) ABSTRACT

A composite shaft assembly including a core structure formed by weaving fiber(s) into an open composite structure. The assembly further includes a first end piece and a second end piece having helically shaped groove(s) and/or axially groove(s) on an outer surface of an end portion of the first and second end piece. Woven into the helical and/or axial groove(s) on the first end piece and at least partially within through hole(s) disposed at an end of the groove(s) is the fiber(s) at a first end portion of the of the core structure. Woven into the helical and/or axial groove(s) on the second end piece and at least partially within through hole(s) disposed at an end of the groove(s) is the fiber(s) at a second end portion of the of the core structure. Structural adhesive (s) are applied over the fiber(s) and allowed to cure to form the composite drive shaft.

27 Claims, 4 Drawing Sheets

(51) Int. Cl.
  *B29C 70/76* (2006.01)
  *F16D 3/38* (2006.01)
  *B29K 105/10* (2006.01)
  *B29L 31/00* (2006.01)

(56) References Cited

U.S. PATENT DOCUMENTS

| | | | | |
|---|---|---|---|---|
| 4,185,472 A | * | 1/1980 | Yates | F16C 3/026 |
| | | | | 464/181 |
| 4,248,062 A | * | 2/1981 | McLain | F16C 3/026 |
| | | | | 464/181 |
| 4,469,730 A | * | 9/1984 | Burhans | B29C 53/585 |
| | | | | 156/169 |
| 4,605,385 A | * | 8/1986 | Puck | F16C 3/026 |
| | | | | 464/181 |
| 4,663,819 A | | 5/1987 | Traylor | |
| 4,792,320 A | | 12/1988 | Nickel | |
| 4,834,932 A | * | 5/1989 | Salzman | F16C 3/026 |
| | | | | 264/250 |
| 4,930,204 A | | 6/1990 | Schurter | |
| 5,288,109 A | * | 2/1994 | Auberon | F16L 47/00 |
| | | | | 138/109 |
| 5,318,374 A | | 6/1994 | Rumberger | |
| 5,342,464 A | | 8/1994 | McIntire et al. | |
| 5,601,494 A | | 2/1997 | Duggan | |
| 5,683,300 A | | 11/1997 | Yasui et al. | |
| 5,727,438 A | | 3/1998 | Beale et al. | |
| 5,899,134 A | | 5/1999 | Klein et al. | |
| 5,913,959 A | | 6/1999 | Klein et al. | |
| 6,334,568 B1 | * | 1/2002 | Seeds | F16C 3/023 |
| | | | | 464/180 |
| 7,427,237 B2 | | 9/2008 | Burkett | |
| 7,963,853 B2 | * | 6/2011 | Brace | F16C 3/026 |
| | | | | 464/181 |
| 8,161,619 B2 | | 4/2012 | Wanthal | |
| 8,859,088 B2 | | 10/2014 | Broughton, Jr. et al. | |
| 8,876,614 B2 | | 11/2014 | Nakamura et al. | |
| 9,303,682 B2 | * | 4/2016 | Sohl | F16C 3/023 |
| 9,378,865 B2 | | 6/2016 | Broughton, Jr. et al. | |
| 9,874,240 B2 | * | 1/2018 | Fiedler | F16C 3/026 |
| 2006/0144903 A1 | | 7/2006 | Perry et al. | |
| 2013/0291476 A1 | | 11/2013 | Broughton, Jr. et al. | |
| 2015/0056449 A1 | | 2/2015 | Broughton, Jr. et al. | |
| 2018/0313398 A1 | * | 11/2018 | Kuhn | F16C 3/023 |
| 2018/0335077 A1 | * | 11/2018 | Oessenich | F16C 3/026 |

* cited by examiner

OPEN COMPOSITE SHAFT

FIELD OF THE DISCLOSURE

The present disclosure relates to an open composite structure for use as a shaft or beam.

BACKGROUND OF THE DISCLOSURE

In recent years' composite materials have received wide spread usage as both structural and non-structural components. A composite material is a material that is made from two or more materials having different physical and/or chemical properties. When the different materials making up the composite material are combined, they produce a new material with characteristics that are different from the individual components making up the composite material.

The use of composite materials in automotive applications is known within the industry due to their light weight and enhanced engineering and physical properties. Conventional tubular composite shafts, such as composite drive shafts, have a core shaft structure that is made of a composite material that is then connected to a metallic end fitting at each end of the composite shaft. The problem with conventional composite drive shafts is the connection between the composite core structure of the shaft and the metallic fittings attached to each end of the shaft. It is well understood that the strength of the connection between the metallic end fittings and the composite core structure of the composite drive shaft is critical to the overall performance and durability of the composite drive shaft. Conventional composite materials known in the art are unable to fuse to the metallic end fittings to the composite core structure of the composite drive shaft with sufficient strength to transfer the rotational power from one drive-line component to another. Additionally, conventional adhesives alone lack sufficient strength to bond the composite core structure to the metallic end fittings and withstand the rotational and longitudinal loads necessary to transfer the rotational power from one component in the vehicle drive-line to another. It would therefore be advantageous to develop a composite drive shaft having a robust attachment to a metallic end fitting and/or other drive line components thereby providing improved functionality and viability.

Typically, the composite core structure of composite drive shafts known in the art are attached to the metallic end fittings by using one or more welds, pins, bolts, screws, flanges, sleeves and/or adhesives. This adds unnecessary complexity to both the manufacturing of the composite structure and the assembly of the composite drive shaft. Additionally, this adds unnecessary weight to the composite drive shaft thereby mitigating one of the main benefits for using composite materials. It would therefore be advantageous to develop a composite drive shaft that does not require the use of mechanical fasteners or mechanical connectors to attach the metallic end fittings to the composite core structure of the composite drive shaft.

SUMMARY OF THE DISCLOSURE

A composite drive shaft assembly having a core structure that is formed by weaving one or more fibres into an open composite structure. The core structure of the composite drive shaft has a first end portion and a second end portion. Integrally connected to at least a portion of the first end portion of the core structure of the composite drive shaft is a first end piece. Additionally, integrally connected to at least a portion of the second end portion of the core structure of the composite drive shaft is a second end piece.

The first end piece and the second end piece of the composite drive shaft assembly have one or more helically shaped grooves and/or axial grooves on an outer surface of an end portion of the first end piece and the second end piece. Disposed at an end of the one or more helically shaped grooves and/or disposed at an end of the one or more axial grooves on the outer surface of the first end piece and the second end piece is one or more through holes.

The one or more fibres at the first end portion of the core structure of the composite drive shaft are woven into the one or more helically shaped grooves and/or into the one or more axial grooves on the outer surface of the first end piece and at least partially within the one or more through holes. Additionally, the one or more fibres at the second end portion of the core structure of the composite drive shaft are woven into the one or more helically shaped grooves and/or into the one or more axial grooves on the outer surface of the second end piece and at least partially within the one or more through holes.

In order to form the open structure composite drive shaft, one or more structural adhesives are applied over the one or more fibres of the composite drive shaft and allowed to cure.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

The present disclosure relates to a composite shaft for use in a motor vehicle. As a non-limiting example the composite shaft is a drive shaft, a prop shaft, a propeller shaft, a cardan shaft and/or a double cardan shaft. The vehicle drive shaft is a mechanical component that is used to transfer the torque and/or rotational energy from one drive-train component to another drive-train component.

It is within the scope of this disclosure, and as a non-limiting example, that the composite shaft disclosed herein may be used in automotive, off-road vehicle, all-terrain vehicle, construction, structural, marine, aerospace, locomotive, military, machinery, robotic and/or consumer product applications. Additionally, as a non-limiting example, the composite shaft disclosed herein may also be used in passenger vehicle, electric vehicle, commercial vehicle and/or heavy vehicle applications.

Figure 1:
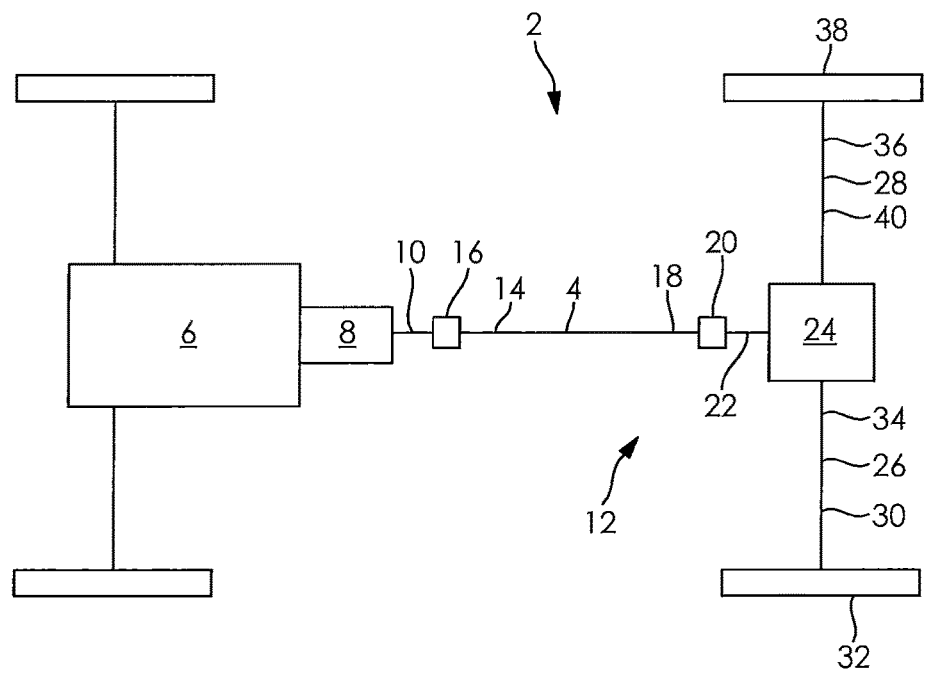
FIG. 1 is a schematic top-plan view of a vehicle having a composite drive shaft according to an embodiment of the disclosure.

FIG. 1 is a schematic top-plan view of a vehicle 2 having a composite drive shaft 4 according to an embodiment of the disclosure. The vehicle 2 has an engine 6 which is drivingly connected to a transmission 8. As non-limiting example, the engine 6 of the vehicle 2 can be an internal combustion engine, an electric motor, a gas turbine and/or a gas turbine. A transmission output shaft 10 is then drivingly connected to an end of the transmission 8 opposite the engine 6. The transmission 8 is a power management system which provides controlled application of the rotational power generated by the engine 6 by means of a gear box.

The composite drive shaft 4 extends from the transmission output shaft 10 and drivingly connects the transmission 8 to a rear axle system 12. A first end 14 of the composite drive shaft 4 is drivingly connected to the end of the transmission output shaft 10 opposite the transmission 8 via a coupling 16. As a non-limiting example, the coupling 16 is a universal joint, a U-joint, a universal coupling, a cardan joint, a double cardan joint, a Hooke's joint, a Spicer joint, a homokinetic coupling, a constant velocity joint, a Hardy Spicer joint or a companion flange. A second end 18 of the composite drive shaft 4 is drivingly connected to a second coupling 20. As a non-limiting example, the second coupling 20 is a universal joint, a U-joint, a universal coupling, a cardan joint, a double cardan joint, a Hooke's joint, a Spicer joint, a homokinetic coupling, a constant velocity joint, a Hardy Spicer joint or a companion flange.

Drivingly connected to an end of the second coupling 20 is an end of a rear axle input shaft 22. In a non-limiting example, the rear axle input shaft 20 is a differential input shaft, a coupling shaft, stub shaft or a differential pinion shaft. Drivingly connected to an end of the rear axle input shaft 20 opposite the composite drive shaft 4 is a rear axle differential 24. The rear axle differential is a set of gears that allows the outer drive wheel(s) of the wheeled vehicle 2 to rotate at a faster rate that the inner drive wheel(s). The rotational power is transmitted through the rear axle system 12 as described in more detail below.

The rear axle system 12 further includes a first rear axle half shaft 26 and a second rear axle half shaft 28. The first rear axle half shaft 26 extends substantially perpendicular to the rear axle input shaft 22. A first end 30 of the first rear axle half shaft 26 is drivingly connected to a first rear axle wheel assembly 32 and a second end 34 of the first rear axle half shaft 26 is drivingly connected to an end of the rear axle differential 24. In a non-limiting example, the second end 34 of the first rear axle half shaft 26 is drivingly connected to a differential side gear, a separate stub shaft, a separate coupling shaft, a rear axle differential output shaft and/or a shaft that is formed as part of a differential side gear.

The second rear axle half shaft 28 also extends substantially perpendicular to the rear axle system input shaft 22. A first end 36 of the second rear axle half shaft 28 is drivingly connected to a second rear axle wheel assembly 38 and a second end 40 of the second rear axle half shaft 28 is drivingly connected to an end of the rear axle differential 24 opposite the first rear axle half shaft 26. In a non-limiting example, the second end 40 of the second rear axle half shaft 28 is drivingly connected to a differential side gear, a separate stub shaft, a separate coupling shaft, a rear axle differential output shaft and/or a shaft that is formed as part of a differential side gear.

Figure 2:
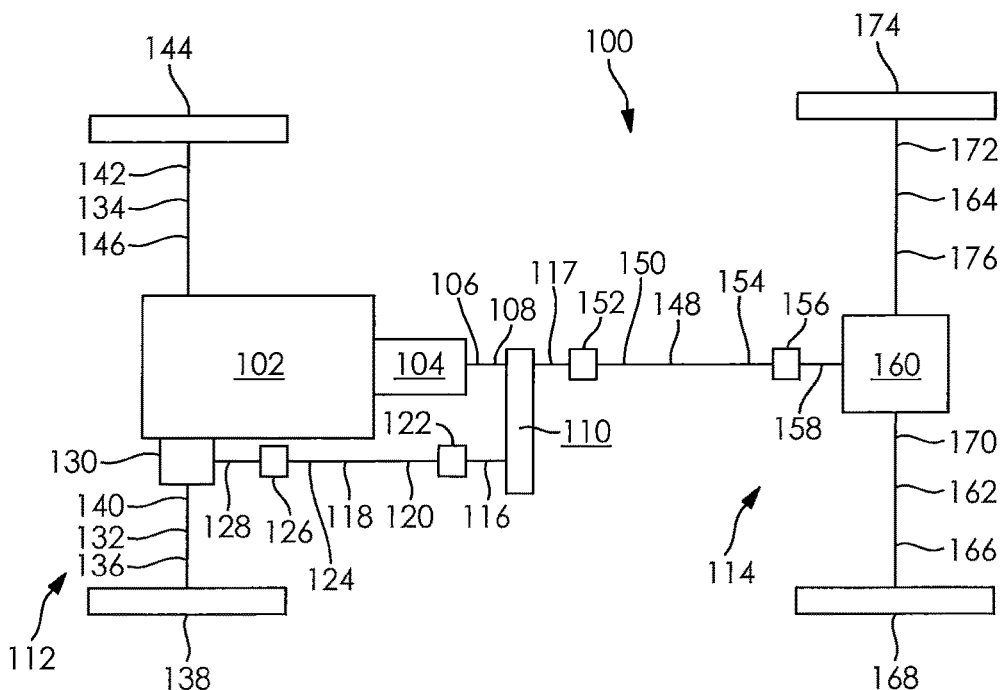
FIG. 2 is a schematic top-plan view of another vehicle having one or more composite drive shafts according to an embodiment of the disclosure.

FIG. 2 is a schematic top-plan view of another vehicle 100 having one or more composite drive shafts according to an embodiment of the disclosure. The vehicle 100 has an engine 102 which is drivingly connected to a transmission 104. As non-limiting example, the engine 102 of the vehicle 100 can be an internal combustion engine, an electric motor, a gas turbine and/or a gas turbine. A transmission output shaft 106 is then drivingly connected to an end of the transmission 104 opposite the engine 102. As previously discussed in relation to FIG. 1, the transmission 104 is a power management system which provides controlled application of the rotational energy generated by the engine 102 by means of a gearbox.

The transmission output shaft 106 is drivingly connected to a transfer case input shaft 108 which in turn is drivingly connected to a transfer case 110. The transfer case 110 is used in four-wheel drive and/or all-wheel-drive (AWD) vehicles to transfer the rotational power from the transmission 104 to a forward axle system 112 and a rear axle system 114 by utilizing a series of gears and drive shafts. The transfer case 110 additionally allows the vehicle 100 to selectively operate in either a two-wheel drive mode of a four-wheel/AWD mode. The transfer case 110 includes a first transfer case output shaft 116 and a second transfer case output shaft 117.

A first composite drive shaft 118 extends from the first transfer case output shaft 116 to the forward axle system 112 of the vehicle 100. A first end 120 of the first composite drive shaft 118 is drivingly connected to an end of the first transfer case output shaft 116 opposite the transfer case 110 via a coupling 122. As a non-limiting example, the coupling 122 is a universal joint, a U-joint, a universal coupling, a cardan joint, a double cardan joint, a Hooke's joint, a Spicer joint, a homokinetic coupling, a constant velocity joint, a Hardy Spicer joint or a companion flange. A second end 124 of the first composite drive shaft 118 is drivingly connected to a second coupling 126. As a non-limiting example, the second coupling 126 is a universal joint, a U-joint, a universal coupling, a cardan joint, a double cardan joint, a Hooke's joint, a Spicer joint, a homokinetic coupling, a constant velocity joint, a Hardy Spicer joint or a companion flange.

Drivingly connected to an end of the second coupling 126 is an end of a forward axle system input shaft 128. In a non-limiting example, the forward axle system input shaft 128 is a forward axle differential input shaft, a coupling shaft, stub shaft or a forward axle differential pinion shaft. Drivingly connected to an end of the forward axle system input shaft 128 opposite the first composite drive shaft 118 is a forward axle differential 130. The forward axle differential is a set of gears that allows the outer drive wheel(s) of the wheeled vehicle 100 to rotate at a faster rate that the inner drive wheel(s). The rotational power is transmitted through the forward axle system 112 as described in more detail below.

The forward axle system 112 further includes a first forward axle half shaft 132 and a second forward axle half shaft 134. The first forward axle half shaft 132 extends substantially perpendicular to the forward axle system input shaft 128. A first end 136 of the first forward axle half shaft 132 is drivingly connected to a first forward axle wheel assembly 138 and a second end 140 of the first forward axle half shaft 132 is drivingly connected to an end of the forward axle differential 130. In a non-limiting example, the second end 140 of the first forward axle half shaft 132 is drivingly connected to a forward axle differential side gear, a separate stub shaft, a separate coupling shaft, a forward axle differential output shaft and/or a shaft that is formed as part of a forward axle differential side gear.

The second forward axle half shaft 134 also extends substantially perpendicular to the forward axle system input shaft 128. A first end 142 of the second forward axle half shaft 134 is drivingly connected to a second forward axle wheel assembly 144 and a second end 146 of the second forward axle half shaft 134 is drivingly connected to an end of the forward axle differential 130 opposite the first forward axle half shaft 132. In a non-limiting example, the second end 146 of the second forward axle half shaft 134 is drivingly connected to a forward axle differential side gear, a separate stub shaft, a separate coupling shaft, a forward axle differential output shaft and/or a shaft that is formed as part of a forward axle differential side gear.

An end of the second transfer case output shaft 117 is drivingly connected to an end of the transfer case 110 opposite the transfer case input shaft 108. A second composite drive shaft 148 extends from the second transfer case output shaft 117 to the rear axle system 114 of the vehicle 100. A first end 150 of the second composite drive shaft 148 is drivingly connected to an end of the second transfer case output shaft 117 opposite the transfer case 110 via a coupling 152. As a non-limiting example, the coupling 152 is a universal joint, a U-joint, a universal coupling, a cardan joint, a double cardan joint, a Hooke's joint, a Spicer joint, a homokinetic coupling, a constant velocity joint, a Hardy Spicer joint or a companion flange. A second end 154 of the second composite drive shaft 148 is drivingly connected to a second coupling 156. As a non-limiting example, the second coupling 156 is a universal joint, a U-joint, a universal coupling, a cardan joint, a double cardan joint, a Hooke's joint, a Spicer joint, a homokinetic coupling, a constant velocity joint, a Hardy Spicer joint or a companion flange.

Drivingly connected to an end of the second coupling 156 is an end of a rear axle system input shaft 158. In a non-limiting example, the rear axle system input shaft 158 is a rear axle differential input shaft, a coupling shaft, stub shaft or a rear axle differential pinion shaft. Drivingly connected to an end of the rear axle system input shaft 158 opposite the second composite drive shaft 148 is a rear axle differential 160. The rear axle differential 160 is a set of gears that allows the outer drive wheel(s) of the wheeled vehicle 100 to rotate at a faster rate that the inner drive wheel(s). The rotational power is transmitted through the rear axle system 114 as described in more detail below.

The rear axle system 114 further includes a first rear axle half shaft 162 and a second rear axle half shaft 164. The first rear axle half shaft 162 extends substantially perpendicular to the rear axle system input shaft 158. A first end 166 of the first rear axle half shaft 162 is drivingly connected to a first rear axle wheel assembly 168 and a second end 170 of the first rear axle half shaft 162 is drivingly connected to an end of the rear axle differential 160. In a non-limiting example, the second end 170 of the first rear axle half shaft 162 is drivingly connected to a rear axle differential side gear, a separate stub shaft, a separate coupling shaft, a rear axle differential output shaft and/or a shaft that is formed as part of a rear axle differential side gear.

The second rear axle half shaft 164 also extends substantially perpendicular to the rear axle system input shaft 158. A first end 172 of the second rear axle half shaft 164 is drivingly connected to a second rear axle wheel assembly 174 and a second end 176 of the second rear axle half shaft 164 is drivingly connected to an end of the rear axle differential 160 opposite the first rear axle half shaft 162. In a non-limiting example, the second end 176 of the second rear axle half shaft 164 is drivingly connected to a rear axle differential side gear, a separate stub shaft, a separate coupling shaft, a rear axle differential output shaft and/or a shaft that is formed as part of a rear axle differential side gear.

Figure 3:
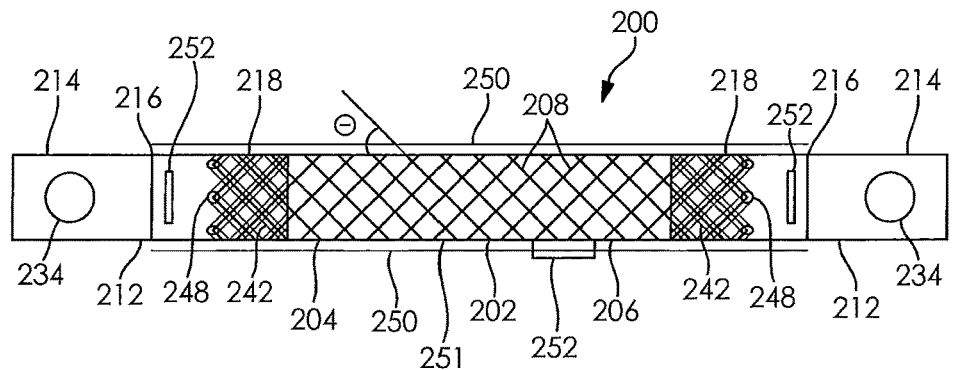
FIG. 3 is a schematic top-plan view of a composite drive shaft according to an embodiment of the disclosure.

FIG. 3 is a schematic top-plan view of a composite drive shaft 200 according to an embodiment of the disclosure. The composite drive shaft 200 has a core structure 202 having a first end portion 204 and a second end portion 206. As illustrated in FIG. 3, the core structure 202 of the composite drive shaft 200 is made by weaving one or more helically oriented strands of yarn or fibres 208 to form the core structure 202 of the composite drive shaft 200. It is within the scope of this disclosure that each of the one or more helically oriented yarns or fibres 208 making up the core structure 202 of the composite drive shaft 200 may each be made of a plurality of strands of yarn or fibres (not shown). In a non-limiting example, the one or more helically oriented yarns or fibres 208 and/or the plurality of strands of yarn or fibres (not shown) making up the one or more helically oriented yarns or fibres 208 are made of carbon fibre tows, pre-impregnated carbon fibre tows, pre-impregnated carbon yarns, aramid fibres such as Kevlar™ from DuPont, polyamide fibres such as Nylon™, Nylon 6 or Nylon 6,6 from DuPont, polyester, vinyl, glass fibres, electrically conductive fibres and/or liquid crystal polymer fibres such as Vectran™ from the Celanese Corporation.

According to an embodiment of the disclosure (not shown), the one or more helically oriented yarns or fibres are woven onto an outer surface of a mandrel using a braiding machine. As a non-limiting example, the braiding machine used to weave the one or more strands of yarn or fibres is a Maypole braiding machine that produces a Maypole braid. The outer surface of the mandrel is shaped to produce the desired shape of the core structure of the composite drive shaft. It is within the scope of this disclosure that the outer surface of the mandrel may take any desired shape to produce any desired shape for the core structure of the composite drive shaft.

In accordance with the embodiment of the disclosure illustrated in FIG. 3, outer surface of the mandrel (not shown) has a substantially cylindrical shape thereby providing the composite drive shaft 200 with a substantially cylindrical core structure 202.

As illustrated in FIG. 3, the one or more helically oriented yarns or fibres 208 forming the core structure 202 of the composite drive shaft 200 are woven at a pre-determined helix angle θ. The helix angle θ determines the pitch of the helically oriented yarns or fibres 208 that are woven on the outer surface (not shown) of the mandrel (not shown). In accordance with the embodiment of the disclosure illustrated in FIG. 3, the one or more helically oriented strands of yarn or fibres 208 are woven onto the outer surface (not shown) of the mandrel (not shown) at a constant helix angle θ, thereby providing the core structure 202 with a substantially constant or a single pitch. Additional helically oriented strands of yarns or fibres 208 may be added to the core structure 202 of the composite drive shaft 200 as needed to alter the mechanical and/or physical properties of the shaft 200.

According to an alternative embodiment of the disclosure (not shown), the helix angle θ of the one or more helically oriented fibres may be altered along the axial length of the core structure of the composite drive shaft to alter the mechanical and/or physical properties of the drive shaft where needed. The composite drive shaft according to this embodiment of the disclosure (not shown) has one or more helically oriented strands of yarn or fibres that are woven to have two or more pitches.

As illustrated in FIG. 3, the core structure 202 of the composite drive shaft 200 is an open-structure or an open-cell composite structure. However, it is within the scope of this disclosure that the core structure 202 of the composite drive shaft 200 may have a closed-structure or a closed-cell composite structure.

Integrally connected to at least a portion of the first end portion 204 and the second end portion 206 of the core structure 202 of the composite drive shaft 200 illustrated in FIG. 3 is a coupling or an end piece 212 having a first end portion 214, a middle portion 216 and a second end portion 218. The middle portion 216 is disposed between the first end portion 214 and the second end portion 218 of the end piece 212. As a non-limiting example, the end piece 212 is a component of a universal joint, a U-joint, a universal coupling, a cardan joint, a double cardan joint, a Hooke's joint, a Spicer joint, a homokinetic coupling, a constant velocity joint, a Hardy Spicer joint or a companion flange. According to the embodiment of the disclosure illustrated in FIGS. 3 and 3A, the end piece 212 is a metallic end yoke. As a non-limiting example, the metallic end yoke may be made of iron, steel, aluminium and/or any other material that is able to withstand the tension, compression, radial, axial and/or torsional loads that are exerted onto the end piece 212. It is within the scope of this disclosure that the end piece attached to the first end portion 204 of the core structure 202 of the composite drive shaft 200 may be different from the end piece attached to the second end portion 206 of the core structure 202 of the composite drive shaft 200.

Figure 3A:
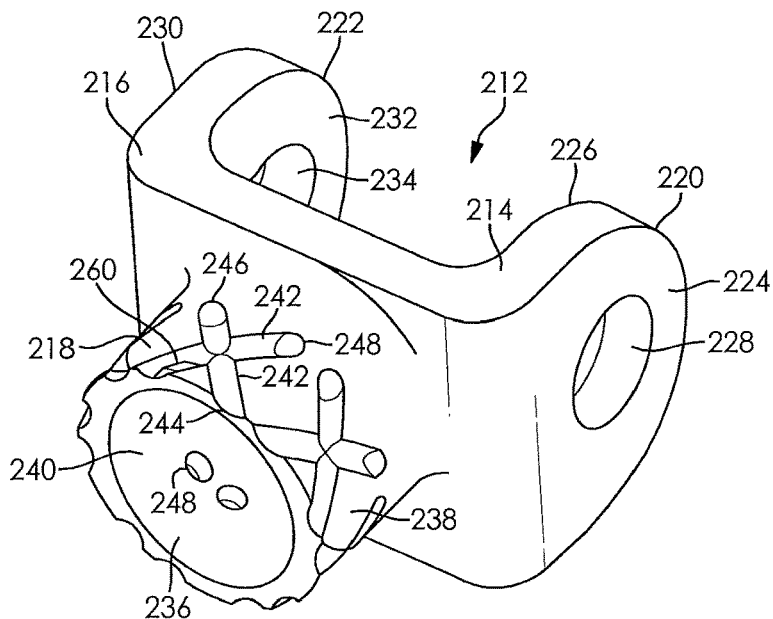
FIG. 3A is a schematic perspective view of an end piece according to the embodiment of the disclosure illustrated in FIG. 3.

According to the embodiment of the disclosure illustrated in FIGS. 3 and 3A, the first end portion 214 of the end piece 212 has a pair of ears or yoke arms 220 and 222 extending axially outboard from the middle portion 216 of the end piece 212. In accordance with an embodiment of the disclosure illustrated in FIG. 3A, the first axially extending yoke arm 220 on the first end portion 214 of the end piece 212 is substantially parallel with the second axially extending yoke are 222 on the first end portion 214 of the end piece 212. The first axially extending yoke arm 220 on the first end portion 214 of the end piece 212 has an outer surface 224 and an inner surface 226. Extending from the outer surface 224 to the inner surface 226 of the first axially extending yoke arm 220 is an opening 228. The opening 228 in the first axially extending yoke arm 220 is of a size and shape to receive at least a portion of a bearing cap (not shown) that is attached to an outer surface of a trunnion (not shown) of a journal cross (not shown).

The second axially extending yoke arm 222 on the first end portion 214 of the end piece 212 has an outer surface 230 and an inner surface 232. Extending from the outer surface 230 to the inner surface 232 of the second axially extending yoke arm 222 is an opening 234. The opening 234 in the second axially extending yoke 222 is aligned with the opening 228 on the first axially extending yoke arm 220 of the end piece 212. The opening 234 in the second axially extending yoke arm 222 is of a size and shape to receive at least a portion of another bearing cap (not shown) that is attached to an outer surface of another trunnion (not shown) of the journal cross (not shown).

As illustrated in FIGS. 3 and 3A, the second end portion 218 of the end piece 212 is a substantially cylindrical in shape. The second end portion 218 of the end piece 212 has an inner surface 236 and an outer surface 238 defining a hollow portion 240 therein. Extending along at least a portion of the outer surface 238 of the second end portion 218 of the end piece 212 is one or more helically shaped grooves 242 having a first end 244 and a second end 246. The one or more helically shaped grooves 242 on at least a portion of the outer surface 238 of the second end portion 218 of the end piece 212 have a helix angle θ that is complementary to the helix angle θ of the one or more helically oriented fibres 208 at the end portions 204 and 206 of the core structure 202 of the composite drive shaft 200. The one or more helical grooves 242 are of a size such that one or more of the one or more helically oriented fibres 208 may be woven into and retained within the one or more helical grooves 242.

Extending from the inner surface 236 to the outer surface 238 of the second end portion 218 of the end piece 212 at the second end 246 of the one or more helical grooves 242 is one or more through holes 248. The one or more through holes 248 at the second end 248 of the one or more helical grooves 242 are of a size such that one or more of the one or more helically oriented fibers 208 are woven into and retained within the one or more through holes 248. It is within the scope of this disclosure that the one or more helically oriented fibres 208 may be woven into the through holes 248 by the braiding machine (not shown) or as a separate step before and/or after the braiding process for the core structure 202 of the composite drive shaft 200.

The one or more helically oriented fibres 208 may be retained within the one or more through holes 248 by any conventional method. As a non-limiting example, the one or more helically oriented fibres 208 are retained within the one or more through holes 248 by press fitting the one or more helically oriented fibres 208 into the through holes 248 and/or by tying a knot at the end of the one or more helically oriented fibres 208 that is larger than the diameter of the one or more through holes 248.

According to an alternative embodiment of the disclosure (not shown), the outer most end of the second end portion of the end piece opposite the middle portion and the first end portion has a chamfer or a rounded edge. Additionally, in accordance with this embodiment of the disclosure (not shown), the one or more through holes may have one or more chamfers or rounded edges as well. The chamfer or rounded edges ensures that the portions of the end piece that are in direct contact with the one or more helically oriented fibers do not abrade the one or more helically oriented fibers thereby improving the overall life and durability of the composite drive shaft.

After the core structure 202 of the composite drive shaft 200 has been braided, after the one or more helically oriented fibres 208 have been woven into the one or more helical grooves 242 and after the one or more helically oriented fibres 208 have been woven into and retained within the one or more through holes 248, one or more structural adhesives 251 are applied to the composite drive shaft 200. As a non-limiting example, the one or more structural adhesives 251 are a binder composition, resin composition, epoxy composition, acrylic composition, urethane composition, cyanoacrylate composition or a mixture thereof.

The one or more structural adhesives 251 are applied to the core structure 202 completely encapsulating the one or more helically oriented fibres 208 making up the core structure 202 of the composite drive shaft 200. Additionally, the one or more structural adhesives 251 are applied to the second end portion 218 of the end piece 212 completely encapsulating the one or more helically oriented fibres 208 and filling the voids in the one or more helically shaped grooves 242 and the one or more through holes 248. It is within the scope of this disclosure that one or more coats of the one or more structural adhesives 251 may be applied to the composite drive shaft 200 in order to achieve the desired chemical, mechanical and/or physical properties.

After the one or more structural adhesives 251 have been applied to the composite drive shaft 200, the one or more structural adhesives 251 are allowed to cure and harden. It is within the scope of this disclosure that one or more heating, cooling, vibration and/or heat treating processes may be used as part of the curing process or as one or more additional steps in manufacturing the composite drive shaft 200 while the one or more structural adhesives 251 are being applied to the drive shaft 200 or after the one or more structural adhesives 251 have cured.

In accordance with an alternative embodiment of the disclosure, the composite drive shaft 200 may further include one or more sealing elements 250 that completely encapsulates the core structure 202 of the composite drive shaft 200. Additionally, it is within the scope of this disclosure that the one or more sealing elements 250 may also completely encapsulate at least a portion of the second end portion 218 of the end piece 212. The one or more sealing elements 250 protect and seal the composite drive shaft 200 from the environment and debris thereby improving the overall life and durability of the composite drive shaft 200. As a non-limiting example, the one or more sealing elements 250 are a non-structural aluminium tube, one or more coatings of a sealant material, a shrink wrap material, a polymeric laminate material, an elastomeric laminate material and/or any other material that will seal and/or protect the composite drive shaft 200 from the environment and debris to improve the life and durability of the drive shaft 200.

In order to prevent the buildup of snow and/or ice on the composite drive shaft 200 a hydrophobic material, NeverWet™ from NeverWet, LLC and/or any other anti-wetting material may be used as the one or more sealing elements 250. Hydrophobic materials are materials that do not attract water but instead repel water from their surface. This makes it harder for snow and/or ice to accumulate on the composite drive shaft 200 thereby improving the overall life and durability of the drive shaft 200.

According to an alternative embodiment of the disclosure (not shown), the end piece is covered with a polymeric material that is electrically insulating prior to weaving the one or more helically oriented yarns or fibres into the one or more helically shaped grooves on the end piece. The electrically insulating polymeric material prevents direct contact between the one or more helically oriented yarns or fibres and the end piece. After the one or more helically oriented yarns or fibres have been woven into the one or more helically shaped grooves on the end piece, a slip ring connector assembly is installed over the one or more helically oriented yarns or fibres and the insulated end piece. The slip ring assembly, also referred to as a rotating electrical connector, is an electromechanical device that allows for the transmission of power and electrical signals from a stationary object to a rotating object.

A typical slip ring assembly is made up of an electrically conductive rotating metallic ring and one or more stationary graphitic and/or metallic contacts that are in direct electrical contact with at least a portion of an outer surface of the electrically conductive rotating ring. Additionally, the one or more stationary graphitic and/or metallic contacts are electrically connected to a source of electrical power. An inner surface of the electrically conductive rotating ring is in direct electrical contact with at least a portion of the one or more yarns or fibres woven into the grooves on the insulated end piece. One or more electrically conductive adhesives may be used to secure the inner surface of the electrically conductive rotating ring to the one or more yarns or fibres and to promote the electrical connection between the one or more yarns or fibres and the electrically conductive rotating ring.

In order to protect the slip ring assembly from the environment, the slip ring assembly may be completely enclosed within a housing. This will aid in improving the overall life, performance and durability of the slip ring assembly.

When in operation, the electrical energy supplied by the source of electrical power is transferred to the one or more stationary graphitic and/or metallic contacts which then transfers the electrical energy to the electrically conductive rotating ring. That electrical energy is then transferred from the electrically conductive rotating ring to the one or more helically oriented yarns or fibres that have been woven into the one or more helically shaped grooves on the end piece. The one or more helically oriented yarns or fibres then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

It is within the scope of this disclosure that the source of electrical power may be may be in electrical contact with the one or more helically oriented fibres by any conventional method. As a non-limiting example and according to an alternative embodiment of the disclosure (not shown), the source of electrical power may be in direct electrical contact with one or more of the one or more helically oriented fibres. As previously discussed, the one or more helically oriented yarns or fibres would then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

As illustrated in FIG. 3 and according to an alternative embodiment of the disclosure, the composite drive shaft 200 may further include one or more balancing weights 252. The one or more balancing weights 252 are used to reduce, eliminate and/or counteract an amount of vibration found in the composite drive shaft 200 when rotating in operation. As a non-limiting example, the one or more balancing weights 252 may be attached to at least a portion of the outer surface 238 of the end piece 212 attached to the first end portion 204 of the core structure 202, attached to at least a portion of the outer surface 238 of the end piece 212 attached to the second end portion 206 of the core structure 202 and/or attached to at least a portion of the core structure 202 of the composite drive shaft 200. Additionally, as a non-limiting example, the one or more balancing weights 252 may be attached using one or more welds, mechanical fasteners and/or adhesives.

In accordance with an alternative embodiment of the disclosure, the one or more balancing weights 252 may be attached to the core structure 202 of the composite drive shaft 200 prior to applying the one or more sealing elements 250 to the composite drive shaft 200. According to this embodiment of the disclosure, the one or more sealing elements 250 may be applied over the one or more balancing weights 252 such that at least a portion of the one or more balancing weights 252 is encapsulated within the one or more sealing elements 250.

According to the embodiment of the disclosure where the one or more sealing elements 250 is a non-structural aluminium tube, the one or more balancing weights 252 may be attached directly to an outer surface of the non-structural aluminium tube sealing element 250. As a non-limiting example, the one or more balancing weights 252 may be attached to the non-structural tube sealing element 250 by using one or more welds, mechanical fasteners and/or adhesives.

In accordance with yet another embodiment of the disclosure, the composite drive shaft 200 further includes one or more sensors 260. The one or more sensors 260 illustrated in FIG. 3A, may be passive sensors and/or active sensors. Additionally, the one or more sensors 260 may be electrical sensors and/or piezoelectric sensors. As illustrated in FIG. 3A the one or more sensors 260 are integrally connected to and disposed within one or more of the one or more helically shaped grooves 242 on the second end portion 218 of the end piece 212. According to this embodiment of the disclosure, the one or more sensors 260 may be integrally connected to one or more of the one or more helically shaped grooves 242 by using one or more adhesives, welds and/or mechanical fasteners. It is within the scope of this disclosure that the one or more sensors 260 may be attached to one or more of the one or more helically shaped grooves 242 before and/or after the one or more helically oriented fibres 208 are woven into the grooves 242. Additionally, it is within the scope of this disclosure that the one or more sensors 260 may be attached to one or more of the one or more helically shaped grooves 242 before and/or after the one or more structural adhesives 251 are applied.

As a non-limiting example, the one or more sensors 260 may be active sensors that use one or more algorithms to monitor the composite drive shaft 200. In accordance with this embodiment of the disclosure, the one or more sensors 260 stimulate the composite drive shaft 200 and monitor how the composite drive shaft 200 responds to the stimulation applied. As a non-limiting example, the stimulus is a mechanical stimulus, an electrical stimulus and/or a vibrational stimulus. The response from the stimulus is then recorded and analyzed by the one or more algorithms. In the event that the response from the stimulation of the composite drive shaft 200 is outside the bounds of a pre-determined ideal range for a response, a signal is sent over a controller area network (CAN bus) (not shown) to the operator of the vehicle (not shown) alerting the operator (not shown) that the composite drive shaft 200 needs to be replaced and/or repaired. As a non-limiting example, the signal sent to the operator (not shown) over the CAN bus (not shown) turns on a warning light, a service light, an indicator light, a repair light, a repair indicator light, service indicator light, an audible alarm, a graphic based message and/or a text based message.

In accordance with another embodiment of the disclosure and as a non-limiting example, the one or more sensors 260 may be passive sensors that measure the amount of vibration in the composite drive shaft 200 by using one or more accelerometers. One or more electronic control units (ECUs) (not shown) compare the vibrational behavior of the composite drive shaft 200 collected and compares it to a pre-determined ideal vibrational range. In the event that the vibrational behavior of the composite drive shaft 200 is outside the bounds of the pre-determined ideal vibrational range, a signal is sent over the CAN bus (not shown) to the operator of the vehicle (not shown) alerting the operator (not shown) that the composite drive shaft 200 needs to be replaced and/or repaired. As a non-limiting example, the signal sent to the operator (not shown) over the CAN bus (not shown) turns on a warning light, a service light, an indicator light, a repair light, a repair indicator light, service indicator light, an audible alarm, a graphic based message and/or a text based message.

According to yet another embodiment of the disclosure and as a non-limiting example, the one or more sensors 260 illustrated in FIG. 3A are one or more torsional transducers. In accordance with this embodiment of the disclosure, the torsional transducer is used to measure and record the amount torque on the composite drive shaft 200 when the composite drive shaft 200 is in a static and/or a dynamic condition. This information is then transferred to and collected by one or more ECUs (not shown) of the vehicle (not shown). One or more algorithms will then analyze and monitor the information collected by the one or more ECUs (not shown) and compare the information to a pre-determined ideal operating behavior to track the performance characteristics of the composite drive shaft 200 and to identify when composite drive shaft 200 needs repaired and/or replaced. In the event that the composite drive shaft 200 needs to be replaced and/or repaired, a signal will be sent from the one or more ECUs (not shown) over a CAN bus (not shown) connecting the one or more ECUs (not shown) alerting the operator of the vehicle (not shown) that the composite drive shaft 200 needs to be replaced and/or repaired. As a non-limiting example, the signal sent to the operator (not shown) over the CAN bus (not shown) turns on a warning light, a service light, an indicator light, a repair light, a repair indicator light, service indicator light, an audible alarm, a graphic based message and/or a text based message.

Figure 4:
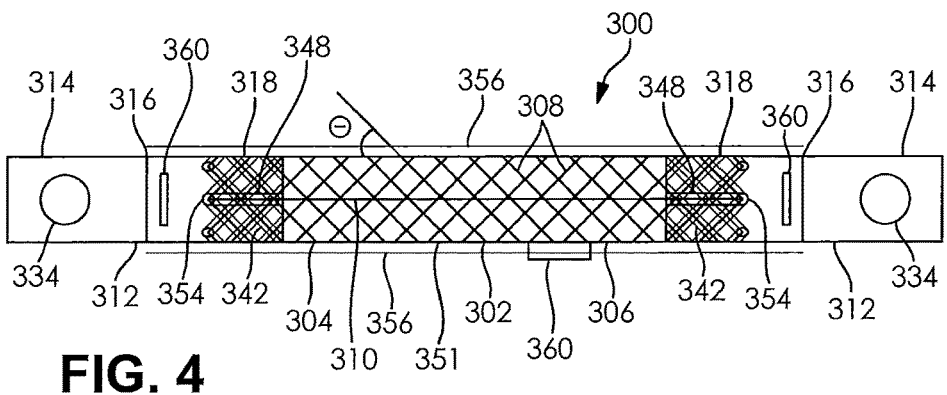
FIG. 4 is a schematic top-plan view of a composite drive shaft according to an alternative embodiment of the disclosure.
Figure 4A:
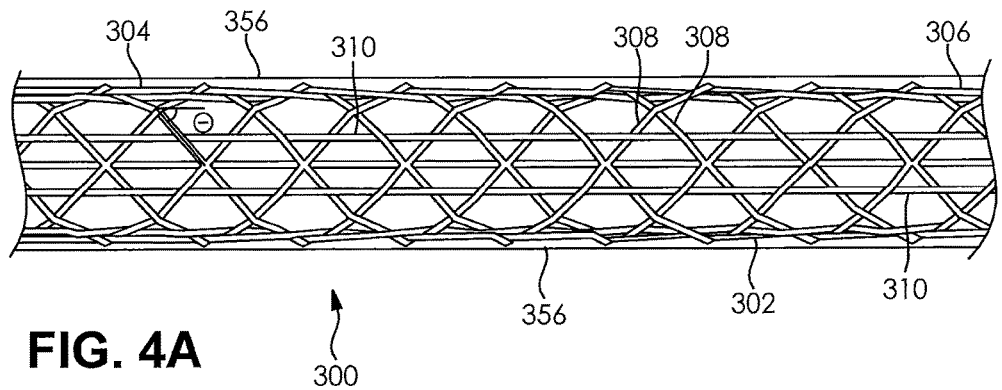
FIG. 4A is a schematic side-view of the core structure of the composite drive shaft according to the alternative embodiment of the disclosure illustrated in FIG. 4.
Figure 4B:
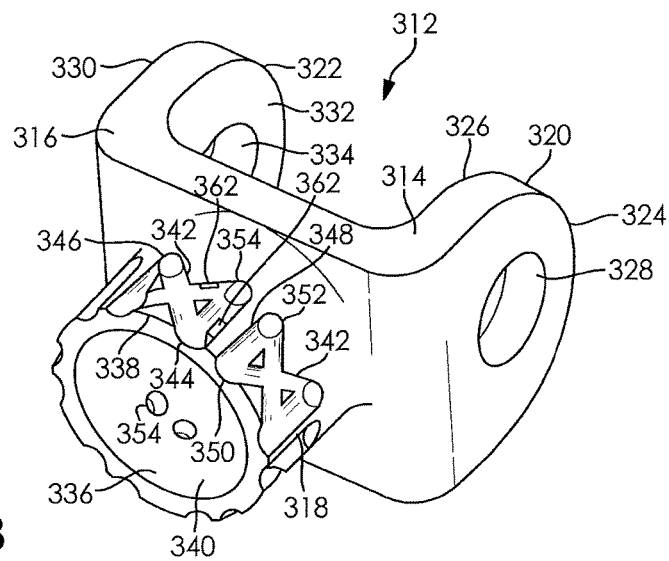
FIG. 4B is a schematic perspective view of an end piece according to the alternative embodiment of the disclosure illustrated in FIGS. 4 and 4A.

FIGS. 4, 4A and 4B illustrate a composite drive shaft 300 having a core structure 302 with an end piece 312 according to an alternative embodiment of the disclosure. In accordance with this embodiment of the disclosure, the core structure 302 of the composite drive shaft 300 has a first end portion 304 and a second end portion 306. As illustrated in FIG. 4, the core structure 302 of the composite drive shaft 300 is made by weaving one or more helically oriented yarns or fibres 308 to form the core structure 302 of the composite drive shaft 300. It is within the scope of this disclosure that each of the one or more helically oriented yarns or fibres 308 making up the core structure 302 of the composite drive shaft 300 may each be made of a plurality of strands of yarn or fibres (not shown). In a non-limiting example, the one or more helically oriented yarns or fibres 308 and/or the plurality of strands of yarn or fibres (not shown) making up the one or more helically oriented yarns or fibres 308 are made of carbon fibre tows, pre-impregnated carbon fibre tows, pre-impregnated carbon yarns, aramid fibres such as Kevlar™ from DuPont, poly-amide fibres such as Nylon™, Nylon 6 or Nylon 6,6 from DuPont, polyester, vinyl, glass fibres, electrically conductive fibres and/or liquid crystal polymer fibres such as Vectran™ from the Celanese Corporation.

According to an embodiment of the disclosure (not shown), the one or more strands of yarn or fibres are woven onto an outer surface of a mandrel using a braiding machine. As a non-limiting example, the braiding machine used to weave the one or more strands of yarn or fibres is a Maypole braiding machine that produces a Maypole braid. The outer surface of the mandrel is shaped to produce the desired shape of the core structure of the composite drive shaft. It is within the scope of this disclosure that the outer surface of the mandrel may take any desired shape to produce any desired shape for the core structure of the composite drive shaft.

In accordance with the embodiment of the disclosure illustrated in FIG. 4, outer surface of the mandrel (not shown) has a substantially cylindrical shape thereby providing the composite drive shaft 300 with a substantially cylindrical core structure 302.

As illustrated in FIGS. 4 and 4A, the one or more helically oriented yarns or fibres 308 forming the core structure 302 of the composite drive shaft 300 are woven at a pre-determined helix angle θ. The helix angle θ determines the pitch of the helically oriented yarns or fibres 308 that are woven on the outer surface (not shown) of the mandrel (not shown). In accordance with the embodiment of the disclosure illustrated in FIG. 4, the one or more helically oriented strands of yarn or fibres 308 are woven onto the outer surface (not shown) of the mandrel (not shown) at a constant helix angle θ, thereby providing the core structure 302 with a substantially constant or a single pitch. Additional helically oriented strands of yarns or fibres 308 may be added to the core structure 302 of the composite drive shaft 300 as needed to alter the mechanical and/or physical properties of the shaft 200.

According to an alternative embodiment of the disclosure (not shown), the helix angle θ of the one or more helically oriented fibres may be altered along the axial length of the core structure of the composite drive shaft to alter the mechanical and/or physical properties of the drive shaft where needed. The composite drive shaft according to this embodiment of the disclosure (not shown) has one or more helically oriented strands of yarn or fibres that are woven to have two or more pitches.

In accordance with the embodiment of the disclosure illustrated in FIGS. 4 and 4A, the core structure 302 of the composite drive shaft 300 further includes one more additional strands of yarn or fibres 310 that are axially oriented to improve the physical and/or mechanical properties of the composite drive shaft 300. As illustrated in FIGS. 4 and 4A, the one or more axially oriented strands of yarn or fibres 310 are interlaced within one or more helically oriented strands of yarn or fibres 308 to produce a tri-axially woven core structure 302. Additional axially oriented strands of yarn or fibres 310 may be added to the core structure 302 of the composite drive shaft 300 as needed to alter the mechanical and/or physical properties of the shaft 300. It is within the scope of this disclosure that each of the one or more axially oriented yarns or fibres 310 making up the core structure 302 of the composite drive shaft 300 may each be made of a plurality of strands of yarn or fibres (not shown). In a non-limiting example, the one or more axially oriented yarns or fibres 310 and/or the plurality of strands of yarn or fibres (not shown) making up the one or more axially oriented yarns or fibres 310 are made of carbon fibre tows, pre-impregnated carbon fibre tows, pre-impregnated carbon yarns, aramid fibres such as Kevlar™ from DuPont, poly-amide fibres such as Nylon™, Nylon 6 or Nylon 6,6 from DuPont, polyester, vinyl, glass fibres, electrically conductive fibres and/or liquid crystal polymer fibres such as Vectran™ from the Celanese Corporation.

As illustrated in FIGS. 4 and 4A, the core structure 302 of the composite drive shaft 300 is an open-structure or an open-cell composite structure. However, it is within the scope of this disclosure that the core structure 302 of the composite drive shaft 300 may have a closed-structure or a closed-cell composite structure.

Integrally connected to at least a portion of the first end portion 304 and the second end portion 306 of the core structure 302 of the composite drive shaft 300 illustrated in FIG. 4 is a coupling or an end piece 312 having a first end portion 314, a middle portion 316 and a second end portion 318. The middle portion 316 is disposed between the first end portion 314 and the second end portion 318 of the end piece 312. As a non-limiting example, the end piece 312 is a component of a universal joint, a U-joint, a universal coupling, a cardan joint, a double cardan joint, a Hooke's joint, a Spicer joint, a homokinetic coupling, a constant velocity joint, a Hardy Spicer joint or a companion flange. In accordance with to the embodiment of the disclosure illustrated in FIGS. 4 and 4B, the end piece 312 is a metallic end yoke. As a non-limiting example, the metallic end yoke may be made of iron, steel, aluminium and/or any other material that is able to withstand the tension, compression, radial, axial and/or torsional loads that are exerted onto the end piece 312. It is within the scope of this disclosure that the end piece attached to the first end portion 304 of the core structure 302 of the composite drive shaft 300 may be different from the end piece attached to the second end portion 306 of the core structure 302 of the composite drive shaft 300.

According to the embodiment of the disclosure illustrated in FIGS. 4 and 4B, the first end portion 314 of the end piece 312 has a pair of ears or yoke arms 320 and 322 extending axially outboard from the middle portion 316 of the end piece 312. In accordance with an embodiment of the disclosure illustrated in FIG. 4B, the first axially extending yoke arm 320 on the first end portion 314 of the end piece 312 is substantially parallel with the second axially extending yoke are 322 on the first end portion 314 of the end piece 312. The first axially extending yoke arm 320 on the first end portion 314 of the end piece 312 has an outer surface 324 and an inner surface 326. Extending from the outer surface 324 to the inner surface 326 of the first axially extending yoke arm 320 is an opening 328. The opening 328 in the first axially extending yoke arm 320 is of a size and shape to receive at least a portion of a bearing cap (not shown) that is attached to an outer surface of a trunnion (not shown) of a journal cross (not shown).

The second axially extending yoke arm 322 on the first end portion 314 of the end piece 312 has an outer surface 330 and an inner surface 332. Extending from the outer surface 330 to the inner surface 332 of the second axially extending yoke arm 322 is an opening 334. The opening 334 in the second axially extending yoke 322 is aligned with the opening 328 on the first axially extending yoke arm 320 of the end piece 312. The opening 334 in the second axially extending yoke arm 322 is of a size and shape to receive at least a portion of another bearing cap (not shown) that is attached to an outer surface of another trunnion (not shown) of the journal cross (not shown).

As illustrated in FIGS. 4 and 4B, the second end portion 318 of the end piece 312 is a substantially cylindrical in shape. The second end portion 318 of the end piece 312 has an inner surface 336 and an outer surface 338 defining a hollow portion 340 therein. Extending along at least a portion of the outer surface 338 of the second end portion 318 of the end piece 312 is one or more helically shaped grooves 342 having a first end 344 and a second end 346. The one or more helically shaped grooves 342 on at least a portion of the outer surface 338 of the second end portion 318 of the end piece 312 have a helix angle θ that is complementary to the helix angle θ of the one or more helically oriented fibres 308 at the end portions 304 and 306 of the core structure 302 of the composite drive shaft 300. The one or more helical grooves 342 are of a size such that one or more of the one or more helically oriented fibres 308 may be woven into and retained within the one or more helical grooves 342.

According to the embodiment of the disclosure illustrated in FIGS. 4 and 4B, the end piece 312 further includes one or more axial grooves 348 having a first end 350 and a second end 352. The one or more axial grooves 348 extend axially along at least a portion of the outer surface 338 of the second end portion 318 of the end piece 312. Additionally, the one or more axial grooves 348 on at least a portion of the outer surface 338 of the second end portion 318 of the end piece 312 extend co-axially with the one or more axially oriented fibres 310 at the end portions 304 and 306 of the core structure 302 of the composite drive shaft 300.

Extending from the inner surface 336 to the outer surface 338 of the second end portion 318 of the end piece 312 at the second end 346 of the one or more helical grooves 342 and/or the second end 352 of the one or more axial grooves 348 is one or more through holes 354. In accordance with an alternative embodiment of the disclosure (not shown), there is one or more through holes disposed at the second end of the one or more helical grooves and there is one or more different through holes that are disposed at the second end of the one or more axial grooves.

The one or more through holes 354 at the second end 348 of the one or more helical grooves 342 and/or at the second end 352 of the one or more axial grooves 348 are of a size such that one or more of the one or more helically oriented fibers 308 and/or the one or more axially oriented fibres 310 are woven into and retained within the one or more through holes 354. It is within the scope of this disclosure that the one or more helically oriented fibres 308 and/or the one or more axially oriented fibres 310 may be woven into the through holes 354 by the braiding machine (not shown) or as a separate step before and/or after the braiding process for the core structure 302.

The one or more helically oriented fibres 308 and/or the one or more axially oriented fibres 310 may be retained within the one or more through holes 354 by any conventional method. As a non-limiting example, the one or more helically oriented fibres 308 and/or the one or more axially oriented fibres 310 are retained within the one or more through holes 354 by press fitting the fibres 308 and 310 into the through holes 354 and/or by tying a knot at the end of the fibres 308 and 310 that is larger than the diameter of the one or more through holes 354.

According to an alternative embodiment of the disclosure (not shown), the outer most end of the second end portion of the end piece opposite the middle portion and the first end portion has a chamfer or a rounded edge. Additionally, in accordance with this embodiment of the disclosure (not shown), the one or more through holes may have one or more chamfers or rounded edges as well. The chamfer or rounded edges ensures that the portions of the end piece that are in direct contact with the one or more helically and/or axially oriented fibers do not abrade the one or more helically and/or axially oriented fibers thereby improving the overall life and durability of the composite drive shaft.

After the core structure 302 of the composite drive shaft 300 has been braided, after the one or more helically oriented fibres 308 have been woven into the one or more helical grooves 342, after the one or more axially oriented fibres 310 have been woven into the one or more axial grooves 348 and after the one or more helically oriented fibres 308 and/or the one or more axially oriented fibres 310 have been woven into and retained within the one or more through holes 354, one or more structural adhesives 351 are applied to the composite drive shaft 300. As a non-limiting example, the one or more structural adhesives 351 are a binder composition, resin composition, epoxy composition, acrylic composition, urethane composition, cyanoacrylate composition or a mixture thereof.

The one or more structural adhesives 351 are applied to the core structure 302 completely encapsulating the one or more helically oriented fibres 308 and completely encapsulating the one or more axially oriented fibres 310 making up the core structure 302 of the composite drive shaft 300. Additionally, the one or more structural adhesives 351 are applied to the second end portion 318 of the end piece 312 completely encapsulating the fibres 308 and 310 and filling the voids in the one or more helically shaped grooves 342, the one or more axial grooves 348 and/or the one or more through holes 354. It is within the scope of this disclosure that one or more coats of the one or more structural adhesives 351 be applied to the composite drive shaft 300 in order to achieve the desired chemical, mechanical and/or physical properties.

After the one or more structural adhesives 351 have been applied to the composite drive shaft 300, the one or more structural adhesives 351 are allowed to cure and harden. It is within the scope of this disclosure that one or more heating, cooling, vibration and/or heat treating processes may be used as part of the curing process or as one or more additional steps in manufacturing the composite drive shaft 300 while the one or more structural adhesives 351 are being applied to the drive shaft 300 or after the one or more structural adhesives 351 have cured.

In accordance with an alternative embodiment of the disclosure, the composite drive shaft 300 may further include one or more sealing elements 356 that completely encapsulates the core structure 302 of the composite drive shaft 300. Additionally, it is within the scope of this disclosure that the one or more sealing elements 356 may also completely encapsulate at least a portion of the second end portion 318 of the end piece 312. The one or more sealing elements 356 protect and seal the composite drive shaft 300 from the environment and debris thereby improving the overall life and durability of the composite drive shaft 300. As a non-limiting example, the one or more sealing elements 356 are a non-structural aluminium tube, a sealant material, a shrink wrap material, a polymeric laminate material, an elastomeric laminate material and/or any other material that will seal and/or protect the composite drive shaft 300 from the environment and debris.

In order to prevent the buildup of snow and/or ice on the composite drive shaft 300 a hydrophobic material, Never-Wet™ from NeverWet, LLC and/or any other anti-wetting material may be used as the one or more sealing elements 356. Hydrophobic materials are materials that do not attract water but instead repel water from their surface. This makes it harder for snow and/or ice to accumulate on the composite drive shaft 300 thereby improving the overall life and durability of the drive shaft 300.

According to an alternative embodiment of the disclosure (not shown), the end piece is covered with a polymeric material that is electrically insulating prior to weaving the one or more helically and axially oriented yarns or fibres into the one or more helically shaped grooves and into the one or more axial grooves in the end piece. The electrically insulating polymeric material prevents direct contact between the end piece and the one or more helically and axially oriented yarns or fibres. After the one or more helically and axially oriented yarns or fibres have been woven into the one or more helically shaped grooves and into the one or more axial grooves on the end piece, a slip ring connector assembly is installed over the one or more helically and axially oriented yarns or fibres and the insulated end piece. The slip ring assembly, also referred to as a rotating electrical connector, is an electromechanical device that allows for the transmission of power and electrical signals from a stationary object to a rotating object.

A typical slip ring assembly is made up of an electrically conductive rotating metallic ring and one or more stationary graphitic and/or metallic contacts that are in direct electrical contact with at least a portion of an outer surface of the electrically conductive rotating ring. Additionally, the one or more stationary graphitic and/or metallic contacts are electrically connected to a source of electrical power. An inner surface of the electrically conductive rotating ring is in direct electrical contact with at least a portion of the one or more yarns or fibres woven into the grooves on the insulated end piece. One or more electrically conductive adhesives may be also used to secure the inner surface of the electrically conductive rotating ring to the one or more yarns or fibres and to promote the electrical connection between the one or more yarns or fibres and the electrically conductive rotating ring.

In order to protect the slip ring assembly from the environment, the slip ring assembly may be completely enclosed within a housing. This will aid in improving the overall life, performance and durability of the slip ring assembly.

When in operation, the electrical energy supplied by the source of electrical power is transferred to the one or more stationary graphitic and/or metallic contacts which then transfers the electrical energy to the electrically conductive rotating ring. That electrical energy is then transferred from the electrically conductive rotating ring to the one or more helically and axially oriented yarns or fibres that have been woven into the one or more grooves on the end piece. One or more of the one or more helically and/or axially oriented yarns or fibres then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

It is within the scope of this disclosure that the source of electrical power may be may be in electrical contact with the one or more helically and/or axially oriented fibres by any conventional method. As a non-limiting example and according to an alternative embodiment of the disclosure (not shown), the source of electrical power may be in direct electrical contact with one or more of the one or more helically and/or axially oriented fibres. As previously discussed, the one or more helically and/or axially oriented yarns or fibres would then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

As previously discussed in relation to FIGS. 3 and 3A and according to an alternative embodiment of the disclosure, the composite drive shaft 300 may further include one or more balancing weights 360. In accordance with this embodiment of the disclosure and as a non-limiting example, the one or more balancing weights 360 may be attached to at least a portion of the outer surface 338 of the end piece 312 attached to the first end portion 304 of the core structure 302, attached to at least a portion of the outer surface 338 of the end piece 312 attached to the second end portion 306 of the core structure 302 and/or attached to at least a portion of the core structure 302 of the composite drive shaft. Additionally, as a non-limiting example, the one or more balancing weights 360 may be attached using one or more welds, mechanical fasteners and/or adhesives.

In accordance with yet another embodiment of the disclosure, the composite drive shaft 300 further includes one or more sensors 362. The one or more sensors 362 illustrated in FIG. 4B, may be passive sensors and/or active sensors. Additionally, the one or more sensors 362 may be electrical sensors and/or piezoelectric sensors. As illustrated in FIG. 4B the one or more sensors 362 are integrally connected to and disposed within one or more of the one or more helically shaped grooves 342 and/or the one or more axial grooves 348 on the second end portion 318 of the end piece 312. According to this embodiment of the disclosure, the one or more sensors 362 may be integrally connected to one or more of the one or more helically shaped grooves 342 and/or to the one or more axial grooves 348 by using one or more adhesives, welds and/or mechanical fasteners. It is within the scope of this disclosure that the one or more sensors 362 may be attached to one or more of the one or more helically shaped grooves 342 and/or to the one or more axial grooves 348 before and/or after the one or more helically and axially oriented fibres 308 and 310 are woven into the grooves 342 and 348. Additionally, it is within the scope of this disclosure that the one or more sensors 362 may be attached to one or more of the one or more helically shaped grooves 342 and/or to the one or more axial grooves 348 before and/or after the one or more structural adhesives 351 are applied.

As a non-limiting example, the one or more sensors 362 may be active sensors that use one or more algorithms to monitor the composite drive shaft 300. In accordance with this embodiment of the disclosure, the one or more sensors 362 stimulate the composite drive shaft 300 and monitor how the composite drive shaft 300 responds to the stimulation applied. As a non-limiting example, the stimulus is a mechanical stimulus, an electrical stimulus and/or a vibrational stimulus. The response from the stimulus is then recorded and analyzed by the one or more algorithms. In the event that the response from the stimulation of the composite drive shaft 300 is outside the bounds of a pre-determined ideal range for a response, a signal is sent over a CAN bus (not shown) to the operator of the vehicle (not shown) alerting the operator (not shown) that the composite drive shaft 300 needs to be replaced and/or repaired. As a non-limiting example, the signal sent to the operator (not shown) over the CAN bus (not shown) turns on a warning light, a service light, an indicator light, a repair light, a repair indicator light, service indicator light, an audible alarm, a graphic based message and/or a text based message.

In accordance with another embodiment of the disclosure and as a non-limiting example, the one or more sensors 362 may be passive sensors that measure the amount of vibration in the composite drive shaft 300 by using one or more accelerometers. One or more ECUs (not shown) compare the vibrational behavior of the composite drive shaft 300 collected and compares it to a pre-determined ideal vibrational range. In the event that the vibrational behavior of the composite drive shaft 300 is outside the bounds of the pre-determined ideal vibrational range, a signal is sent over the CAN bus (not shown) to the operator of the vehicle (not shown) alerting the operator (not shown) that the composite drive shaft 300 needs to be replaced and/or repaired. As a non-limiting example, the signal sent to the operator (not shown) over the CAN bus (not shown) turns on a warning light, a service light, an indicator light, a repair light, a repair indicator light, service indicator light, an audible alarm, a graphic based message and/or a text based message.

According to yet another embodiment of the disclosure and as a non-limiting example, the one or more sensors 362 illustrated in FIG. 4B are one or more torsional transducers. In accordance with this embodiment of the disclosure, the torsional transducer is used to measure and record the amount torque on the composite drive shaft 300 when the composite drive shaft 300 is in a static and/or a dynamic condition. This information is then transferred to and collected by one or more ECUs (not shown) of the vehicle (not shown). One or more algorithms will then analyze and monitor the information collected by the one or more ECUs (not shown) and compare the information to a pre-determined ideal operating behavior to track the performance characteristics of the composite drive shaft 300 and to identify when composite drive shaft 300 needs repairs and/or to identify when the composite drive shaft 300 needs to be replaced. In the event that the composite drive shaft 300 needs to be replaced or repaired, a signal will be sent from the one or more ECUs (not shown) over a CAN bus (not shown) connecting the one or more ECUs (not shown) alerting the operator of the vehicle (not shown) that the composite drive shaft 300 needs to be replaced and/or repaired. As a non-limiting example, the signal sent to the operator (not shown) over the CAN bus (not shown) turns on a warning light, a service light, an indicator light, a repair light, a repair indicator light, service indicator light, an audible alarm, a graphic based message and/or a text based message.

Figure 5:
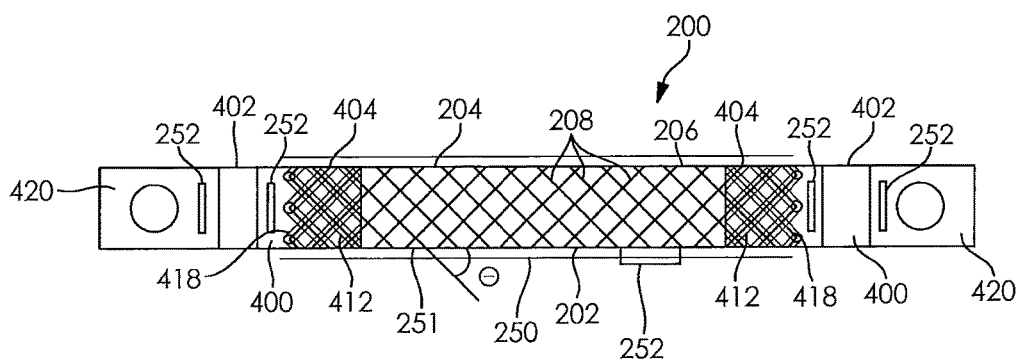
FIG. 5 is a schematic top-plan view of the composite drive shaft illustrated in FIG. 3 having an end piece according to yet another embodiment of the disclosure.
Figure 5A:
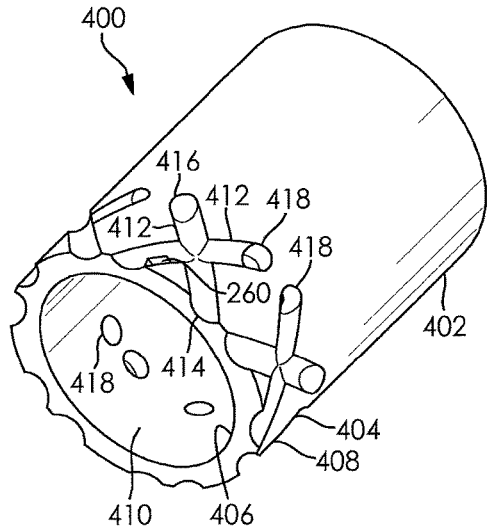
FIG. 5A is a schematic perspective view of the end piece according to the embodiment of the disclosure illustrated in FIG. 5.

FIGS. 5 and 5A illustrate the composite drive shaft 200 illustrated in FIG. 3 having an end piece 400 according to an alternative embodiment of the disclosure. The composite drive shaft 200 illustrated in FIG. 5 is the same as the composite drive shaft 200 previously described in relation to FIG. 3, except where specifically noted below. As illustrated in FIG. 5 and as previously discussed in relation to FIG. 3 of the disclosure, the composite drive shaft 200 includes a core structure 202 having a first end portion 204 and a second end portion 206. Additionally, as illustrated in FIGS. 3 and 5 of the disclosure, the core structure 202 of the composite drive shaft 200 includes one or more helically oriented yarns or fibres 208 that are woven onto the outer surface (not shown) of the mandrel (not shown) at a helix angle θ. It is within the scope of this disclosure that the one or more helically oriented yarns or fibres 208 of the core structure 202 of the composite drive shaft 200 may be woven at a single pitch or woven to have more than one pitch. Additional helically oriented strands of yarns or fibres 208 may be added to the core structure 202 of the composite drive shaft 200 as needed to alter the mechanical and/or physical properties of the shaft 200.

Integrally connected to at least a portion of the first end portion 204 and the second end portion 206 of the core structure 202 of the composite drive shaft 200 illustrated in FIG. 5 is a coupling or an end piece 400. The end piece 400 has a first end portion 402, a second end portion 404, an inner surface 406 and an outer surface 408. The inner surface 406 and the outer surface 408 of the end piece 400 defines a hollow portion 410 therein. As illustrated in FIGS. 5 and 5A and as a non-limiting example, the end piece 400 is substantially cylindrical in shape.

Extending along at least a portion of the outer surface 408 of the second end portion 404 of the end piece 400 is one or more helically shaped grooves 412 having a first end 414 and a second end 416. The one or more helically shaped grooves 412 on at least a portion of the outer surface 408 of the second end portion 404 of the end piece 400 have a helix angle θ that is complementary to the helix angle θ of the one or more helically oriented fibres 208 at the end portions 204 and 206 of the core structure 202 of the composite drive shaft 200. The one or more helical grooves 412 are of a size such that one or more of the one or more helically oriented fibres 208 may be woven into and retained within the one or more helical grooves 412.

Extending from the inner surface 406 to the outer surface 408 of the second end portion 404 of the end piece 400 at the second end 416 of the one or more helical grooves 412 is one or more through holes 418. The one or more through holes 418 at the second end 416 of the one or more helical grooves 412 are of a size such that one or more of the one or more helically oriented fibers 208 are woven into and retained within the one or more through holes 418. It is within the scope of this disclosure that the one or more helically oriented fibres 208 may be woven into the through holes 418 by the braiding machine (not shown) or as a separate step before and/or after the braiding process for the core structure 202 of the composite drive shaft 200.

The one or more helically oriented fibres 208 may be retained within the one or more through holes 418 by any conventional method. As a non-limiting example, the one or more helically oriented fibres 208 are retained within the one or more through holes 418 by press fitting the one or more helically oriented fibres 208 into the through holes 418 and/or by tying a knot at the end of the one or more helically oriented fibres 208 that is larger than the diameter of the one or more through holes 418.

According to an alternative embodiment of the disclosure (not shown), the outer most end of the second end portion of the end piece opposite the first end portion has a chamfer or a rounded edge. Additionally, in accordance with this embodiment of the disclosure (not shown), the one or more through holes may have one or more chamfers or rounded edges as well. The chamfer or rounded edges ensures that the portions of the end piece that are in direct contact with the one or more helically oriented fibers do not abrade the one or more helically oriented fibers thereby improving the overall life and durability of the composite drive shaft.

In accordance with the embodiment of the disclosure illustrated in FIGS. 5 and 5A, the end piece 400 is a generic metallic end piece. As a non-limiting example, the generic metallic end piece may be made of iron, steel, aluminium and/or any other material that is able to withstand the tension, compression, radial, axial and/or torsional loads that are exerted onto the end piece 400. It is within the scope of this disclosure that the end piece attached to the first end portion 204 of the core structure 202 of the composite drive shaft 200 may be different from the end piece attached to the second end portion 206 of the core structure 202 of the composite drive shaft 200.

After the core structure 202 of the composite drive shaft 200 has been braided, after the one or more helically oriented fibres 208 have been woven into the one or more helical grooves 242, and after the one or more helically oriented fibres 208 have been woven into and retained within the one or more through holes 418, the one or more structural adhesives 251 are applied to the composite drive shaft 200.

The one or more structural adhesives 251 are applied to the core structure 202 completely encapsulating the one or more helically oriented fibres 208 making up the core structure 202 of the composite drive shaft 200. Additionally, the one or more structural adhesives 251 are applied to the second end portion 404 of the end piece 400 completely encapsulating the fibres 208 and filling the voids in the one or more helically shaped grooves 412 and/or the one or more through holes 418. It is within the scope of this disclosure that one or more coats of the one or more structural adhesives 251 be applied to the composite drive shaft 200 in order to achieve the desired chemical, mechanical and/or physical properties.

In accordance with an alternative embodiment of the disclosure, the composite drive shaft 200 may further include one or more sealing elements 250 that completely encapsulates the core structure 202 of the composite drive shaft 200. Additionally, it is within the scope of this disclosure that the one or more sealing elements 250 may also completely encapsulate at least a portion of the second end portion 404 of the end piece 400. The one or more sealing elements 250 protect and seal the composite drive shaft 200 from the environment and debris thereby improving the overall life and durability of the composite drive shaft 200. As previously discussed in relation to FIGS. 3 and 3A and as a non-limiting example, the one or more sealing elements 250 are a non-structural aluminium tube, a sealant material, a shrink wrap material, a polymeric laminate material, a NeverWet™ material from NeverWet, LLC, a hydrophobic material, an anti-wetting material, an elastomeric laminate material and/or any other material that will seal and/or protect the composite drive shaft 200 from the environment and debris.

According to an alternative embodiment of the disclosure (not shown), the end piece is covered with a polymeric material that is electrically insulating prior to weaving the one or more helically oriented yarns or fibres into the one or more helically shaped grooves in the end piece. The electrically insulating polymeric material prevents direct contact between the one or more helically oriented yarns or fibres and the end piece. After the one or more helically oriented yarns or fibres have been woven into the one or more helically shaped grooves on the end piece, a slip ring connector assembly is installed over the one or more helically oriented yarns or fibres and the insulated end piece. The slip ring assembly, also referred to as a rotating electrical connector, is an electromechanical device that allows for the transmission of power and electrical signals from a stationary object to a rotating object.

A typical slip ring assembly is made up of an electrically conductive rotating metallic ring and one or more stationary graphitic and/or metallic contacts that are in direct electrical contact with at least a portion of an outer surface of the electrically conductive rotating ring. Additionally, the one or more stationary graphitic and/or metallic contacts are electrically connected to a source of electrical power. An inner surface of the electrically conductive rotating ring is in direct electrical contact with at least a portion of the one or more yarns or fibres woven into the grooves on the insulated end piece. One or more electrically conductive adhesives may be also used to secure the inner surface of the electrically conductive rotating ring to the one or more yarns or fibres and to promote the electrical connection between the one or more yarns or fibres and the electrically conductive rotating ring.

In order to protect the slip ring assembly from the environment, the slip ring assembly may be completely enclosed within a housing. This will aid in improving the overall life, performance and durability of the slip ring assembly.

When in operation, the electrical energy supplied by the source of electrical power is transferred to the one or more stationary graphitic and/or metallic contacts which then transfers the electrical energy to the electrically conductive rotating ring. That electrical energy is then transferred from the electrically conductive rotating ring to the one or more helically oriented yarns or fibres that have been woven into the one or more helically shaped grooves on the end piece. The one or more helically oriented yarns or fibres then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

It is within the scope of this disclosure that the source of electrical power may be may be in electrical contact with the one or more helically oriented fibres by any conventional method. As a non-limiting example and according to an alternative embodiment of the disclosure (not shown), the source of electrical power may be in direct electrical contact with one or more of the one or more helically oriented fibres. As previously discussed, the one or more helically oriented yarns or fibres would then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

Integrally connected to at least a portion of the first end portion 402 of the end piece 400 is at least a portion of an end of a drive shaft coupling 420. As a non-limiting example, the drive shaft coupling 420 is a component of a universal joint, a U-joint, a universal coupling, a cardan joint, a double cardan joint, a Hooke's joint, a Spicer joint, a homokinetic coupling, a constant velocity joint, a Hardy Spicer joint, a companion flange or an output shaft for an electric motor. According to the embodiment of the disclosure illustrated in FIG. 5, the drive shaft coupling 420 is a metallic end yoke. As a non-limiting example, the metallic end yoke may be made of iron, steel, aluminium and/or any other material that is able to withstand the tension, compression, radial, axial and/or torsional loads that are exerted onto the drive shaft coupling 420. It is within the scope of this disclosure that the drive shaft coupling that is attached to the end piece 400 attached to the first end portion 204 of the core structure 202 may be different from the drive shaft coupling that is attached to the end piece 400 attached to the second end portion 206 of the core structure 202 of the composite drive shaft 200.

The first end portion 402 of the end piece 400 may be integrally connected to at least a portion of the end of the drive shaft coupling 420 by any conventional method. As a non-limiting example, the first end portion 402 of the end piece 400 may be integrally connected to at least a portion of the end of the drive shaft coupling 420 by using one or more welds, mechanical fasteners, a threaded connection, a splined connection and/or one or more adhesives. Additionally, it is within the scope of this disclosure that the drive shaft coupling 420 may be integrally connected to the first end portion 402 of the end piece 400 before, during and/or after the one or more structural adhesives 251 are applied to the composite drive shaft 200 and cured.

In accordance with an alternative embodiment of the disclosure, the end piece 400 is initially provided at a pre-determined length necessary to properly secure the end pieces 400 in the braiding machine (not shown). In accordance with this embodiment of the disclosure, the end piece 400 is subsequently cut and/or machined down to a pre-determined length prior to attaching the drive shaft coupling 420 to at least a portion of the first end portion 402 of the end piece 400.

As previously discussed in relation to FIGS. 3 and 3A and as illustrated in FIG. 5, the composite drive shaft 200 according to an alternative embodiment of the disclosure may further include one or more balancing weights 252. In accordance with this embodiment of the disclosure and as a non-limiting example, the one or more balancing weights 252 may be attached to at least a portion of the outer surface 408 of the end piece 400 attached to the first end portion 204 of the core structure 202, attached to at least a portion of the outer surface 408 of the end piece 400 attached to the second end portion 206 of the core structure 202, attached to at least a portion of one or more of the drive shaft couplings 420 and/or attached to at least a portion of the core structure 202 of the composite drive shaft 200. Additionally, as a non-limiting example, the one or more balancing weights 252 may be attached using one or more welds, mechanical fasteners and/or adhesives.

In accordance with yet another embodiment of the disclosure, the composite drive shaft 200 illustrated in FIGS. 5 and 5A may further include one or more sensors 260. As illustrated in FIG. 5A the one or more sensors 260 are integrally connected to and disposed within one or more of the one or more helically shaped grooves 412 on the second end portion 404 of the end piece 400. According to this embodiment of the disclosure, the one or more sensors 260 may be integrally connected to one or more of the one or more helically shaped grooves 412 by using one or more adhesives, welds and/or mechanical fasteners. It is within the scope of this disclosure that the one or more sensors 260 may be attached to one or more of the one or more helically shaped grooves 412 before and/or after the one or more helically oriented fibres 208 are woven into the grooves 412. Additionally, the one or more sensors 260 may be attached to one or more of the one or more helically shaped grooves 412 before and/or after the one or more structural adhesives 251 are applied.

Figure 6:
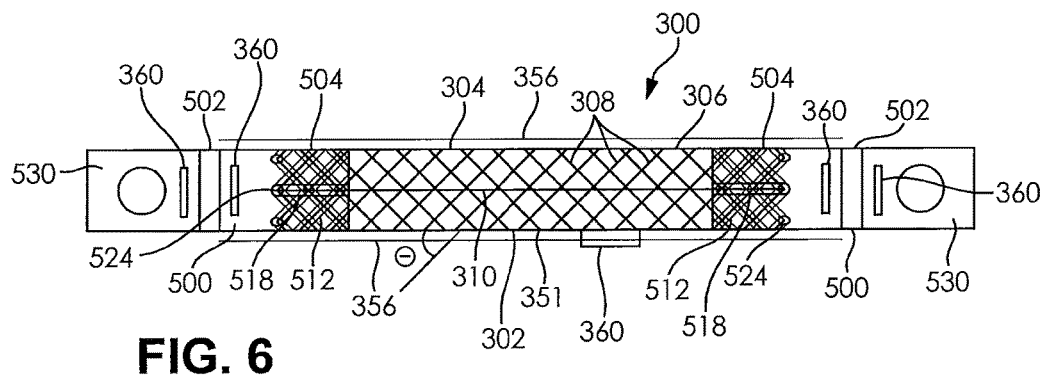
FIG. 6 is a schematic top-plan view of the composite drive shaft illustrated in FIGS. 4 and 4A having an end piece according to still yet another embodiment of the disclosure.
Figure 6A:
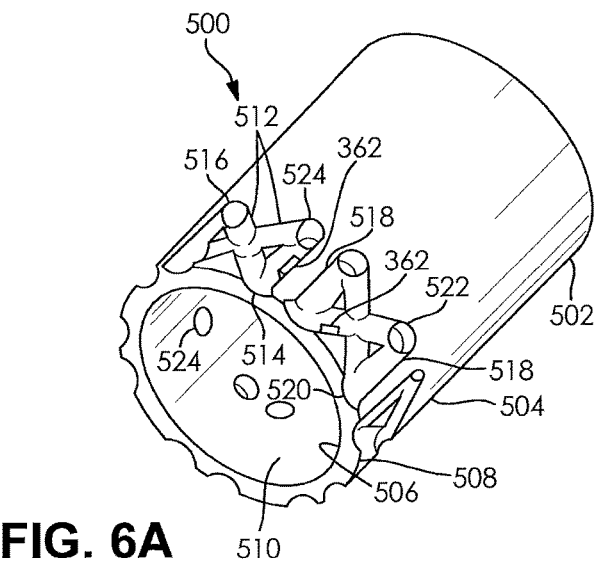
FIG. 6A is a schematic perspective view of an end piece according to the embodiment of the disclosure illustrated in FIG. 6.

FIGS. 6 and 6A illustrate the composite drive shaft 300 illustrated in FIGS. 4 and 4A having an end piece 500 according to yet another embodiment of the disclosure. The composite drive shaft 300 illustrated in FIG. 6 is the same as the composite drive shaft 300 previously described in relation to FIGS. 4 and 4A, except where specifically noted below. As illustrated in FIG. 6 and as previously discussed in relation to FIGS. 4 and 4A, the composite drive shaft 300 includes a core structure 302 having a first end portion 304 and a second end portion 304. Additionally, as illustrated in FIGS. 4, 4A and 6 of the disclosure, the core structure 302 of the composite drive shaft 300 includes one or more helically oriented yarns or fibres 308 that are woven onto the outer surface (not shown) of the mandrel (not shown) at a helix angle θ. It is within the scope of this disclosure that the one or more helically oriented yarns or fibres 308 of the core structure 302 of the composite drive shaft 300 may be woven at a single pitch or woven to have more than one pitch. Additional helically oriented strands of yarns or fibres 308 may be added to the core structure 302 of the composite drive shaft 300 as needed to alter the mechanical and/or physical properties of the shaft 300.

As previously discussed and in accordance with the embodiment of the disclosure illustrated in FIGS. 4 and 4A, the core structure 302 of the composite drive shaft 300 further includes one more additional strands of yarn or fibres 310 that are axially oriented to improve the physical and/or mechanical properties of the composite drive shaft 300. As illustrated in FIGS. 4, 4A and 6, the one or more axially oriented strands of yarn or fibres 310 are interlaced within one or more helically oriented strands of yarn or fibres 308 to produce a tri-axially woven core structure 302. Additional axially oriented strands of yarn or fibres 310 may be added to the core structure 302 of the composite drive shaft 300 as needed to alter the mechanical and/or physical properties of the shaft 300.

Integrally connected to at least a portion of the first end portion 304 and the second end portion 306 of the core structure 302 of the composite drive shaft 300 illustrated in FIG. 6 is the coupling or an end piece 500. The end piece 500 has a first end portion 502, a second end portion 504, an inner surface 506 and an outer surface 508. The inner surface 506 and the outer surface 508 of the end piece 500 defines a hollow portion 510 therein. As illustrated in FIGS. 6 and 6A and as a non-limiting example, the end piece 500 is substantially cylindrical in shape.

Extending along at least a portion of the outer surface 508 of the second end portion 504 of the end piece 500 is one or more helically shaped grooves 512 having a first end 514 and a second end 516. The one or more helically shaped grooves 512 on at least a portion of the outer surface 508 of the second end portion 504 of the end piece 500 have a helix angle θ that is complementary to the helix angle θ of the one or more helically oriented fibres 308 at the end portions 304 and 306 of the core structure 302 of the composite drive shaft 300. The one or more helical grooves 512 are of a size such that one or more of the one or more helically oriented fibres 308 may be woven into and retained within the one or more helical grooves 512.

According to the embodiment of the disclosure illustrated in FIGS. 6 and 6A, the end piece 500 further includes one or more axial grooves 518 having a first end 520 and a second end 522. The one or more axial grooves 518 extend axially along at least a portion of the outer surface 508 of the second end portion 504 of the end piece 500. Additionally, the one or more axial grooves 518 on at least a portion of the outer surface 508 of the second end portion 504 of the end piece 500 extend co-axially with the one or more axially oriented fibres 310 at the end portions 304 and 306 of the core structure 302 of the composite drive shaft 300.

Extending from the inner surface 506 to the outer surface 508 of the second end portion 504 of the end piece 500 at the second end 516 of the one or more helical grooves 512 and/or the second end 522 of the one or more axial grooves 518 is one or more through holes 524. In accordance with an alternative embodiment of the disclosure (not shown), there is one or more through holes disposed at the second end of the one or more helical grooves and there is one or more different through holes that are disposed at the second end of the one or more axial grooves.

As previously discussed in relation to FIGS. 4, 4A and 4B, the one or more through holes 524 at the second end 516 of the one or more helical grooves 512 and/or at the second end 522 of the one or more axial grooves 518 are of a size such that one or more of the one or more helically oriented fibers 308 and/or the one or more axially oriented fibres 310 are woven into and retained within the one or more through holes 524. It is within the scope of this disclosure that the one or more helically oriented fibres 308 and/or the one or more axially oriented fibres 310 may be woven into the through holes 524 by the braiding machine (not shown) or as a separate step before and/or after the braiding process for the core structure 302.

The one or more helically oriented fibres 308 and/or the one or more axially oriented fibres 310 may be retained within the one or more through holes 514 by any conventional method. As a non-limiting example, the one or more helically oriented fibres 308 and/or the one or more axially oriented fibres 310 are retained within the one or more through holes 524 by press fitting the fibres 308 and 310 into the through holes 524. Alternatively, the one or more helically oriented fibres 308 and/or the one or more axially oriented fibres 310 may be retained within the one or more through holes 524 by tying a knot at the end of the fibres 308 and 310 that is larger than the diameter of the one or more through holes 524.

According to an alternative embodiment of the disclosure (not shown), the outer most end of the second end portion of the end piece opposite the first end portion has a chamfer or a rounded edge. Additionally, in accordance with this embodiment of the disclosure (not shown), the one or more through holes may have one or more chamfers or rounded edges as well. The chamfer or rounded edges ensures that the portions of the end piece that are in direct contact with the one or more helically and/or axially oriented fibers do not abrade the one or more helically and/or axially oriented fibers thereby improving the overall life and durability of the composite drive shaft.

In accordance with the embodiment of the disclosure illustrated in FIGS. 6 and 6A, the end piece 500 is a generic metallic end piece. As a non-limiting example, the generic metallic end piece may be made of iron, steel, aluminium and/or any other material that is able to withstand the tension, compression, radial, axial and/or torsional loads that are exerted onto the end piece 500. It is within the scope of this disclosure that the end piece attached to the first end portion 304 of the core structure 302 of the composite drive shaft 300 may be different from the end piece attached to the second end portion 306 of the core structure 302 of the composite drive shaft 300.

After the core structure 302 of the composite drive shaft 300 has been braided, after the one or more yarns or fibres 308 and 310 have been woven into the one or more grooves 512 and 518, and after the one or more yarns or fibres 308 and 310 have been woven into and retained within the one or more through holes 248, the one or more structural adhesives 351 are applied to the composite drive shaft 300.

The one or more structural adhesives 351 are applied to the core structure 302 completely encapsulating the one or more helically oriented fibres 308 and the one or more axially oriented fibres 310 making up the core structure 302 of the composite drive shaft 300. Additionally, the one or more structural adhesives 351 are applied to the second end portion 504 of the end piece 500 completely encapsulating the fibres 308 and 310 and filling the voids in the one or more helically shaped grooves 412, the one or more axial grooves 518 and/or the one or more through holes 524. It is within the scope of this disclosure that one or more coats of the one or more structural adhesives 351 be applied to the composite drive shaft 300 in order to achieve the desired chemical, mechanical and/or physical properties.

In accordance with an alternative embodiment of the disclosure, the composite drive shaft 300 may further include one or more sealing elements 356 that completely encapsulates the core structure 302 of the composite drive shaft 300. Additionally, it is within the scope of this disclosure that the one or more sealing elements 356 may also completely encapsulate at least a portion of the second end portion 504 of the end piece 500. The one or more sealing elements 356 protect and seal the composite drive shaft 300 from the environment and debris thereby improving the overall life and durability of the composite drive shaft 300. As previously discussed in relation to FIGS. 4, 4A and 4B and as a non-limiting example, the one or more sealing elements 356 are a non-structural aluminium tube, a sealant material, a shrink wrap material, a polymeric laminate material, a NeverWet™ material from NeverWet, LLC, a hydrophobic material, an anti-wetting material, an elastomeric laminate material and/or any other material that will seal and/or protect the composite drive shaft 300 from the environment and debris.

According to an alternative embodiment of the disclosure (not shown), the end piece is covered with a polymeric material that is electrically insulating prior to weaving the one or more helically and axially oriented yarns or fibres into the one or more helically shaped grooves and axial grooves in the end piece. The electrically insulating polymeric material prevents direct contact between the one or more helically and axially oriented yarns or fibres and the end piece. After the one or more helically and axially oriented yarns or fibres have been woven into the one or more helically shaped grooves and axial grooves on the end piece, a slip ring connector assembly is installed over the one or more helically and axially oriented yarns or fibres and the insulated end piece. The slip ring assembly, also referred to as a rotating electrical connector, is an electromechanical device that allows for the transmission of power and electrical signals from a stationary object to a rotating object.

A typical slip ring assembly is made up of an electrically conductive rotating metallic ring and one or more stationary graphitic and/or metallic contacts that are in direct electrical contact with at least a portion of an outer surface of the electrically conductive rotating ring. Additionally, the one or more stationary graphitic and/or metallic contacts are electrically connected to a source of electrical power. An inner surface of the electrically conductive rotating ring is in direct electrical contact with at least a portion of the one or more yarns or fibres woven into the grooves on the insulated end piece. One or more electrically conductive adhesives may be also used to secure the inner surface of the electrically conductive rotating ring to the one or more yarns or fibres and to promote the electrical connection between the one or more yarns or fibres and the electrically conductive rotating ring.

In order to protect the slip ring assembly from the environment, the slip ring assembly may be completely enclosed within a housing. This will aid in improving the overall life, performance and durability of the slip ring assembly.

When in operation, the electrical energy supplied by the source of electrical power is transferred to the one or more stationary graphitic and/or metallic contacts which then transfers the electrical energy to the electrically conductive rotating ring. That electrical energy is then transferred from the electrically conductive rotating ring to the one or more helically and axially oriented yarns or fibres that have been woven into the one or more helically shaped grooves or axial grooves on the end piece. One or more of the one or more helically and/or axially oriented yarns or fibres then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

It is within the scope of this disclosure that the source of electrical power may be may be in electrical contact with the one or more helically and/or axially oriented fibres by any conventional method. As a non-limiting example and according to an alternative embodiment of the disclosure (not shown), the source of electrical power may be in direct electrical contact with one or more of the one or more helically and/or axially oriented fibres. As previously discussed, the one or more helically and/or axially oriented yarns or fibres would then act as an electrical resistor thereby converting the electrical energy from the source of electrical power into heat energy. That heat energy generated is then used to melt any snow and/or ice that has built up on the composite drive shaft. Additionally, that heat energy generated can be used to prevent the buildup of snow and/or ice on the composite drive shaft as well.

Integrally connected to at least a portion of the first end portion 502 of the end piece 500 is at least a portion of the end of the drive shaft coupling 420 illustrated in FIGS. 5 and 6 of the disclosure. As previously discussed in relation to FIG. 5 and as a non-limiting example, the drive shaft coupling 420 is a component of a universal joint, a U-joint, a universal coupling, a cardan joint, a double cardan joint, a Hooke's joint, a Spicer joint, a homokinetic coupling, a constant velocity joint, a Hardy Spicer joint, a companion flange or an output shaft for an electric motor. According to the embodiment of the disclosure illustrated in FIGS. 5 and 6, the drive shaft coupling 420 is a metallic end yoke. As a non-limiting example, the metallic end yoke may be made of iron, steel, aluminium and/or any other material that is able to withstand the tension, compression, radial, axial and/or torsional loads that are exerted onto the drive shaft coupling 420. It is within the scope of this disclosure that the drive shaft coupling that is attached to the end piece 500 attached to the first end portion 304 of the core structure 302 may be different from the drive shaft coupling that is attached to the end piece 500 attached to the second end portion 306 of the core structure 302 of the composite drive shaft 300.

The first end portion 502 of the end piece 500 may be integrally connected to at least a portion of the end of the drive shaft coupling 420 by any conventional method. As a non-limiting example, the first end portion 502 of the end piece 500 may be integrally connected to at least a portion of the end of the drive shaft coupling 420 by using one or more welds, mechanical fasteners, a threaded connection, a splined connection and/or one or more adhesives. Additionally, it is within the scope of this disclosure that the drive shaft coupling 420 may be integrally connected to the first end portion 502 of the end piece 500 before, during and/or after the one or more structural adhesives (not shown) are applied to the composite drive shaft 300 and cured.

In accordance with an alternative embodiment of the disclosure, the end piece 500 is initially provided at a pre-determined length necessary to properly secure the end pieces 500 in the braiding machine (not shown). In accordance with this embodiment of the disclosure, the end piece 500 is subsequently cut and/or machined down to a pre-determined length prior to attaching the drive shaft coupling 420 to at least a portion of the first end portion 502 of the end piece 500.

As previously discussed in relation to FIGS. 4, 4A and 4B and as illustrated in FIG. 6, the composite drive shaft 300 according to an alternative embodiment of the disclosure may further include one or more balancing weights 360. In accordance with this embodiment of the disclosure and as a non-limiting example, the one or more balancing weights 360 may be attached to at least a portion of the outer surface 508 of the end piece 500 attached to the first end portion 304 of the core structure 302, attached to at least a portion of the outer surface 508 of the end piece 500 attached to the second end portion 306 of the core structure 302, attached to at least a portion of one or more of the drive shaft couplings 530 and/or attached to at least a portion of the core structure 302 of the composite drive shaft 300. Additionally, as a non-limiting example, the one or more balancing weights 360 may be attached using one or more welds, mechanical fasteners and/or adhesives.

In accordance with yet another embodiment of the disclosure, the composite drive shaft 300 illustrated in FIGS. 6 and 6A may further include one or more sensors 362. As illustrated in FIG. 6A the one or more sensors 362 are integrally connected to and disposed within one or more of the one or more helically shaped grooves 512 and/or the one or more axial grooves 518 on the second end portion 504 of the end piece 500. According to this embodiment of the disclosure, the one or more sensors 362 may be integrally connected to one or more of the one or more helically shaped grooves 512 and/or the one or more axial grooves 518 by using one or more adhesives, welds and/or mechanical fasteners. It is within the scope of this disclosure that the one or more sensors 362 may be attached to one or more of the one or more helically shaped grooves 512 and/or the one or more axial grooves 518 before and/or after the one or more helically and axially oriented fibres 308 and 310 are woven into the grooves 512 and 518. Additionally, the one or more sensors 362 may be attached to one or more of the one or more grooves 512 and 516 before and/or after the one or more structural adhesives 351 are applied.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A method of making a composite shaft comprising:
providing a first end piece, wherein said first end piece comprises one or more helically shaped grooves and/or one or more axial grooves on an outer surface of an end portion of said first end piece and one or more through holes disposed at an end of said one or more helically shaped grooves and/or disposed at an end of said one or more axial grooves, wherein said one or more through holes extend from an inner surface to said outer surface of said first end piece;

providing a second end piece, wherein said second end piece comprises one or more helically shaped grooves and/or one or more axial grooves on an outer surface of an end portion of said second end piece and one or more through holes disposed at an end of said one or more helically shaped grooves and/or disposed at an end of said one or more axial grooves, wherein said one or more through holes extend from an inner surface to said outer surface of said second end piece;

weaving one or more fibres into an open composite structure to form a core structure;

weaving a first end portion of said one or more fibres of said core structure into said one or more helically shaped grooves and/or said one or more axial grooves on said outer surface of said first end piece and at least partially into said one or more through holes of said first end piece;

weaving a second end portion of said one or more fibres of said core structure into said one or more helically shaped grooves and/or said one or more axial grooves on said outer surface of said second end piece and at least partially into said one or more through holes of said second end piece;

applying one or more structural adhesives to said one or more woven fibres; and curing said one or more structural adhesives to form an open structure composite shaft.

2. The method of making a composite shaft of claim 1, wherein said one or more fibres of said open structure composite shaft are one or more helically oriented fibres and/or one or more axially oriented fibres.

3. The method of making a composite shaft of claim 2, wherein said one or more helically oriented fibres are woven at one or more pre-determined helix angles A.

4. The method of making a composite shaft of claim 2, further comprising the steps of:
weaving one or more helically oriented fibres into said core structure of said open composite structure at one or more pre-determined helix angles θ; and
weaving one or more axially oriented fibres into said core structure of said open composite structure to interlace with said one or more helically oriented fibres of said core structure of said open composite structure.

5. The method of making a composite shaft of claim 1, wherein said one or more fibres are one or more carbon fibre tows, pre-impregnated carbon fibre tows, pre-impregnated carbon yarns, aramid fibres, Kevlar, poly-amide fibres, Nylon, Nylon 6-6, Nylon 6, polyester, vinyl, glass fibres, electrically conductive fibres and/or liquid crystal polymer fibres.

6. The method of making a composite shaft of claim 1, wherein said one or more structural adhesives are a binder composition, resin composition, epoxy composition, acrylic composition, urethane composition, cyanoacrylate composition or a mixture thereof.

7. The method of making a composite shaft of claim 1, wherein said first end piece and said second end piece is a metallic drive shaft end yoke.

8. The method of making a composite shaft of claim 1, further comprising the steps of:

attaching a metallic drive shaft end yoke to at least a portion of an end portion of said first end piece opposite said one or more helically shaped grooves and/or said one or more axial grooves; and attaching a metallic drive shaft end yoke to at least a portion of an end portion of said second end piece opposite said one or more helically shaped grooves and/or said one or more axial grooves.

9. The method of making a composite shaft of claim 1, further comprising the steps of:

cutting an end portion of said first end piece opposite said one or more helically shaped grooves and/or said one or more axial grooves to a desired length;

attaching a metallic drive shaft end yoke to at least a portion of an end portion of said first end piece opposite said one or more helically shaped grooves and/or said one or more axial grooves;

cutting an end portion of said second end piece opposite said one or more helically shaped grooves and/or said one or more axial grooves to a desired length; and attaching a metallic drive shaft end yoke to at least a portion of an end portion of said second end piece opposite said one or more helically shaped grooves and/or said one or more axial grooves.

10. The method of making a composite shaft of claim 1, further comprising the steps of:

attaching one or more balancing weights to at least a portion of said outer surface of said first end piece, to at least a portion of said outer surface of second end piece and/or to at least a portion of said core structure of said open structure composite shaft.

11. The method of making a composite shaft of claim 1, further comprising the steps of:

attaching one or more sensors within one or more of said one or more helically shaped grooves on said outer surface of said end portion of said first end piece, within one or more of said one or more axial grooves on said outer surface of said end portion of said first end piece, within one or more of said one or more helically shaped grooves on said outer surface of said end portion of said second end piece and/or within one or more of said one or more axial grooves on said outer surface of said end portion of said second end piece.

12. The method of making a composite shaft of claim 11, wherein said one or more sensors are operably configured to determine when said composite shaft needs to be repaired or replaced.

13. The method of making a composite shaft of claim 1, further comprising the steps of:

encapsulating at least a portion of said core structure, at least a portion said first end piece and/or at least a portion said second end piece of said open structure composite shaft with one or more sealing elements.

14. The method of claim 13, wherein said one or more sealing elements are a non-structural aluminium tube, a hydrophobic material, a sealant material, a shrink wrap material, a polymeric laminate material and/or an elastomeric laminate material.

15. The method of making a composite shaft of claim 1, wherein one or more of said one or more fibres of said core structure are capable of converting an amount of electrical energy from a source of electrical power into an amount of heat energy.

16. A composite shaft assembly, comprising:
a first end piece having a first end portion and a second end portion;

wherein said second end portion of said first end piece has an inner surface and an outer surface defining a hollow portion therein;
one or more helically shaped grooves and/or one or more axial grooves extend along at least a portion of said outer surface of said second end portion of said first end piece;
wherein said one or more helically shaped grooves and/or said one or more axial grooves on said second end portion on said first end piece have a first end and a second end;
one or more through holes extend from said inner surface to said outer surface of said second end portion of said first end piece;
wherein said one or more through holes in said second end portion of said first end piece are disposed at said second end of said one or more helically shaped grooves and/or at said second end of said one or more axial grooves;
a second end piece having a first end portion and a second end portion;
wherein said second end portion of said second end piece has an inner surface and an outer surface defining a hollow portion therein;
one or more helically shaped grooves and/or one or more axial grooves extend along at least a portion of said outer surface of said second end portion of said second end piece;
wherein said one or more helically shaped grooves and/or said one or more axial grooves on said second end portion of said second end piece have a first end and a second end;
one or more through holes extend from said inner surface to said outer surface of said second end portion of said second end piece;
wherein said one or more through holes in said second end portion of said second end piece are disposed at said second end of said one or more helically shaped grooves and/or at said second end of said one or more axial grooves;
a composite core structure having one or more helically oriented fibres and/or one or more axially oriented fibres;
wherein said composite core structure has a first end portion and a second end portion;
wherein at least a portion of said one or more helically oriented fibres and/or said one or more axially oriented fibres at said first end portion of said composite core structure are disposed within said one or more helically shaped grooves and/or said one or more axial grooves on said outer surface of said second end portion of said first end piece;
wherein at least a portion of said one or more helically oriented fibres and/or said one or more axially oriented fibres at said first end portion of said composite core structure are disposed within said one or more through holes in said second end portion of said first end piece;
wherein at least a portion of said one or more helically oriented fibres and/or said one or more axially oriented fibres at said second end portion of said composite core structure are disposed within said one or more helically shaped grooves and/or said one or more axial grooves on said outer surface of said second end portion of said second end piece;
wherein at least a portion of said one or more helically oriented fibres and/or said one or more axially oriented fibres at said second end portion of said composite core structure are disposed within said one or more through holes in said second end portion of said second end piece; and
one or more structural adhesives encapsulate at least a portion of said one or more helically oriented fibres, at least a portion of said one or more axially oriented fibres, at least a portion of said one or more helically shaped grooves of said first end piece, at least a portion of said one or more helically shaped grooves of said second end piece, at least a portion of said one or more axial grooves of said first end piece, at least a portion of said one or more axial grooves of said second end piece, at least a portion of said one or more through holes in said first end piece and/or at least a portion of said one or more through holes in said second end piece.

17. The composite shaft assembly of claim 16, wherein said first end piece further comprises a first axially extending yoke arm and a second axially extending yoke arm extending axially outboard from a middle portion of said first end piece;
wherein said first axially extending yoke arm on said first end piece has an opening extending from an inner surface to an outer surface of said first axially extending yoke arm;
wherein said second axially extending yoke arm on said first end piece has an opening extending from an inner surface to an outer surface of said second axially extending yoke arm;
wherein said opening in said first axially extending yoke arm on said first end piece is aligned with said opening in said second axially extending yoke arm on said first end piece;
wherein said second end piece further comprises a first axially extending yoke arm and a second axially extending yoke arm extending axially outboard from a middle portion of said first end piece;
wherein said first axially extending yoke arm on said second end piece has an opening extending from an inner surface to an outer surface of said first axially extending yoke arm;
wherein said second axially extending yoke arm on said second end piece has an opening extending from an inner surface to an outer surface of said second axially extending yoke arm; and
wherein said opening in said first axially extending yoke arm of said second end piece is aligned with said opening in said second axially extending yoke arm on said second end piece.

18. The composite shaft assembly of claim 16, wherein said first end piece further comprises a first drive shaft coupling;
wherein at least a portion of said first drive shaft coupling is integrally connected to at least a portion of said first end portion of said first end piece;
wherein said second end piece further comprises a second drive shaft coupling; and
wherein at least a portion of said second drive shaft coupling is integrally connected to at least a portion of said first end portion of said second end piece.

19. The composite shaft assembly of claim 16, wherein said one or more structural adhesives are a binder composition, resin composition, epoxy composition, acrylic composition, urethane composition, cyanoacrylate composition or a mixture thereof.

20. The composite shaft assembly of claim 16, wherein said one or more helically oriented fibres and/or said one or more axially oriented fibres are one or more carbon fibre tows, pre-impregnated carbon fibre tows, pre-impregnated carbon yarns, aramid fibres, Kevlar, poly-amide fibres, Nylon, Nylon 6-6, Nylon 6, polyester, vinyl, glass fibres, electrically conductive fibres and/or liquid crystal polymer fibres.

21. The composite shaft assembly of claim 16, further comprising one or more sensors;
wherein at least a portion of said one or more sensors are integrally connected to and disposed within one or more of said one or more helically shaped grooves on said outer surface of said second end portion of said first end piece, within one or more of said one or more axial grooves on said outer surface of said second end portion of said first end piece, within one or more of said one or more helically shaped grooves on said outer surface of said second end portion of said second end piece and/or within one or more of said one or more axial grooves on said outer surface of said second end portion of said second end piece.

22. The composite shaft assembly of claim 21, wherein said one or more sensors are operably configured to determine when said composite shaft needs to be repaired or replaced.

23. The composite shaft assembly of claim 16, further comprising one or more sealing elements;
wherein said one or more sealing elements completely encapsulate at least a portion of said composite core structure, at least a portion of said second end portion of said first end piece and/or at least a portion of said second end portion of said second end piece.

24. The composite shaft assembly of claim 23, wherein said one or more sealing elements are a non-structural aluminium tube, a hydrophobic material, a sealant material, a shrink wrap material, a polymeric laminate material and/or an elastomeric laminate material.

25. The composite shaft assembly of claim 16, wherein one or more of said one or more helically and/or axially oriented fibres are capable of converting an amount of electrical energy from a source of electrical power into an amount of heat energy.

26. A composite shaft end piece, comprising:
an end piece having a first end portion and a second end portion;
wherein said second end portion of said end piece has an inner surface and an outer surface defining a hollow portion therein;
one or more helically shaped grooves and/or one or more axial grooves extend along at least a portion of said outer surface of said second end portion of said end piece;
wherein said one or more helically shaped grooves and/or said one or more axial grooves on said second end portion on said end piece have a first end and a second end;
one or more through holes extend from said inner surface to said outer surface of said end piece; and
wherein said one or more through holes in said end piece are disposed at said second end of said one or more helically shaped grooves and/or at said second end of said one or more axial grooves.

27. A composite shaft end piece, comprising:
an end piece having a first end portion and a second end portion;
wherein said second end portion of said end piece has an inner surface and an outer surface defining a hollow portion therein;
one or more helically shaped grooves and/or one or more axial grooves extend along at least a portion of said outer surface of said second end portion of said end piece;
wherein said one or more helically shaped grooves and/or said one or more axial grooves on said second end portion on said end piece have a first end and a second end;
one or more through holes extend from said inner surface to said outer surface of said end piece;
wherein said one or more through holes in said end piece are disposed at said second end of said one or more helically shaped grooves and/or at said second end of said one or more axial grooves;
a first axially extending yoke arm and a second axially extending yoke arm extending axially outboard from a middle portion of said end piece;
wherein said first axially extending yoke arm on said end piece has an opening extending from an inner surface to an outer surface of said first axially extending yoke arm;
wherein said second axially extending yoke arm on said end piece has an opening extending from an inner surface to an outer surface of said second axially extending yoke arm; and
wherein said opening in said first axially extending yoke arm on said end piece is aligned with said opening in said second axially extending yoke arm on said end piece.

* * * * *

UNITED STATES PATENT AND TRADEMARK OFFICE
CERTIFICATE OF CORRECTION

PATENT NO.        : 10,344,794 B2
APPLICATION NO.   : 15/355957
DATED             : July 9, 2019
INVENTOR(S)       : Steven G. Slesinski, Eve Steigerwalt and Harry W. Trost Page 1 of 1

It is certified that error appears in the above-identified patent and that said Letters Patent is hereby corrected as shown below:

In the Claims

Claim 3, Column 29, Line 41, replace "angles A." with "angles θ."
Claim 23, Column 33, Line 30, delete "completely"

Signed and Sealed this
Twenty-second Day of October, 2019

Andrei Iancu
*Director of the United States Patent and Trademark Office*